United States Patent [19]

Yeh et al.

[11] Patent Number: 4,991,131

[45] Date of Patent: Feb. 5, 1991

[54] MULTIPLICATION AND ACCUMULATION DEVICE

[75] Inventors: I-Hau Yeh; Ye-O You, both of Taipei; Wen-Zen Shen, Hsin Chu, all of Taiwan

[73] Assignee: Industrial Technology Research Institute, Taiwan

[21] Appl. No.: 106,493

[22] Filed: Oct. 6, 1987

[51] Int. Cl.$^5$ .............................................. G06F 7/50
[52] U.S. Cl. ................................. 364/748; 364/758; 364/760
[58] Field of Search ............... 364/748, 736, 754, 755, 364/758-760

[56] References Cited

U.S. PATENT DOCUMENTS

| | | | |
|---|---|---|---|
| 3,829,673 | 8/1974 | Bouton, Jr. et al. | 364/748 |
| 4,534,010 | 8/1985 | Kobayashi et al. | 364/748 |
| 4,546,446 | 10/1985 | Machida | 364/759 |
| 4,594,679 | 6/1986 | George et al. | 364/754 |
| 4,649,508 | 3/1987 | Kanuma | 364/748 |
| 4,755,962 | 7/1988 | Mor | 364/760 |

Primary Examiner—Eugene R. LaRoche
Assistant Examiner—Benny Lee
Attorney, Agent, or Firm—Darby & Darby

[57] ABSTRACT

A multiplication device is provided for forming the product of a first and a second N-bit input binary number. The multiplication device receives the two input binary numbers and forms a two's complement product expressed in a product sum and a product carry term. The product sum and product carry terms are formed by providing an offset generation means which generates a numerical binary offset of the value determined by $X=(4-2^{-(n-1)})$ and a partial product generating means which generates first and second sets of partial products. An addition means adds the offset value and first and second sets of partial products are added to form the resultant product sum and product carry terms. The product sum and product carry terms are conveyed to a second addition means wherein they are added to form a two's complement product result. Preferably the multiplication device is provided with an accumulation means to form the sum of the products of all successive pairs of input binary numbers. In this manner, the second addition means also receives from a holding means an accumulation of previously formed products in two's complement form and adds the accumulation of products, the product sum and the product carry terms to form a new two's complement accumulation of products. The new accumulation of products is conveyed to the holding means where it replaces the old accumulation of products.

35 Claims, 22 Drawing Sheets

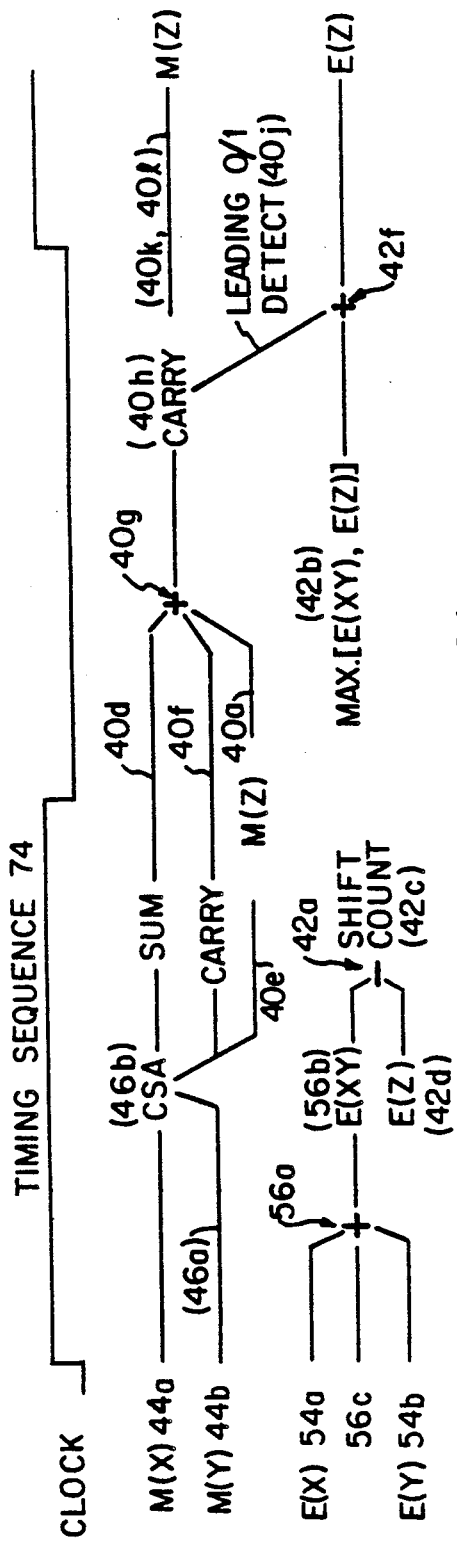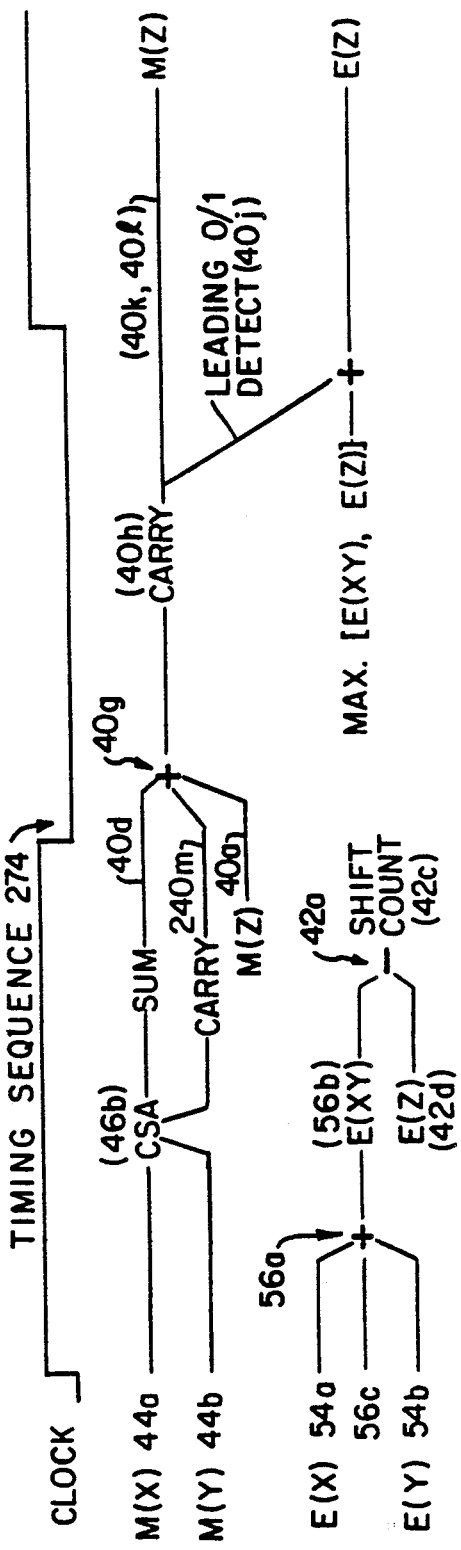

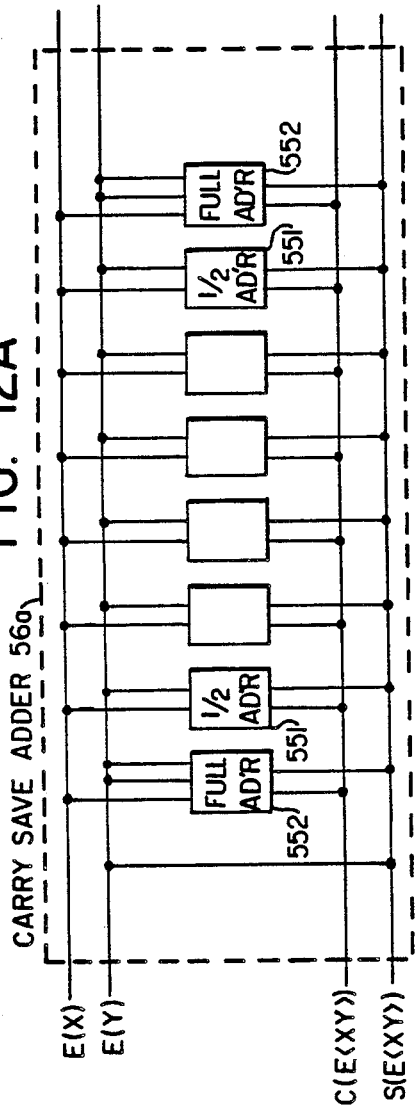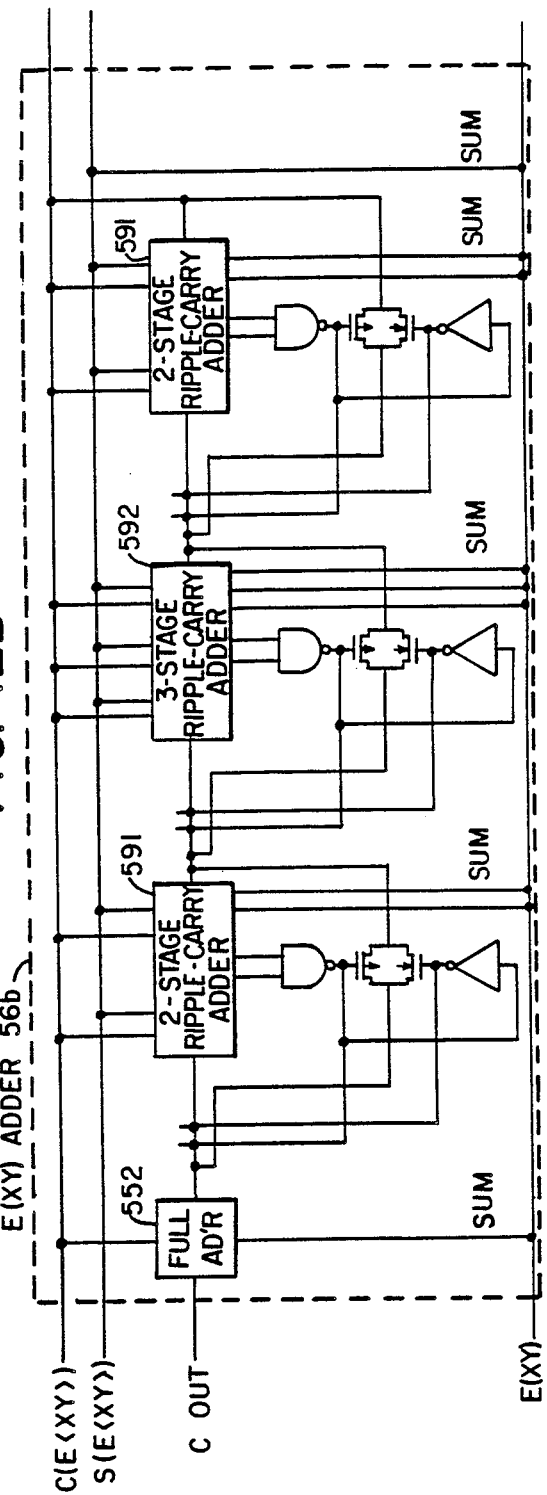

ENCODING CIRCUIT 600

LEADING "0"/"1" DETECTOR 40j

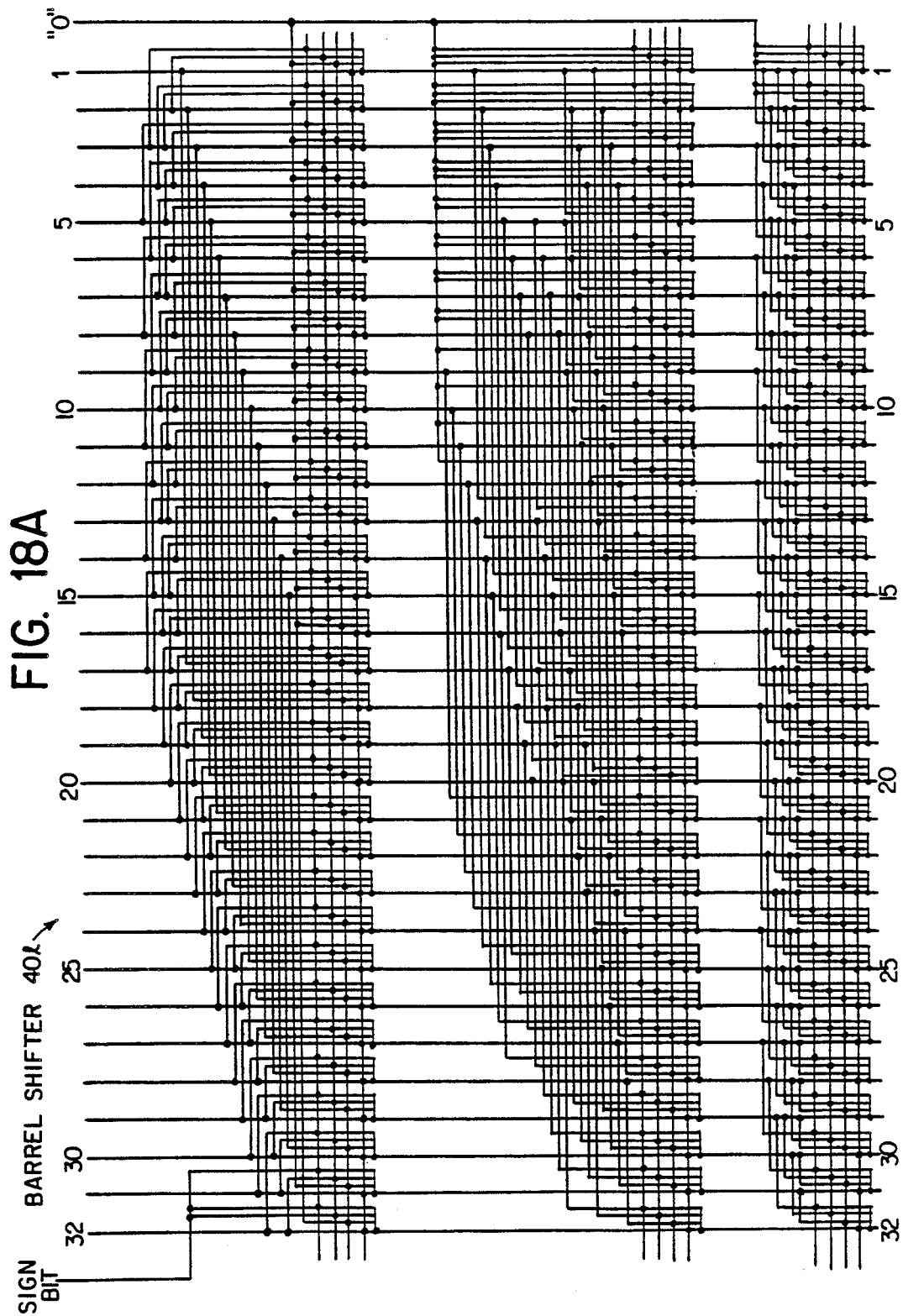

MULTIPLICATION AND ACCUMULATION DEVICE

The present invention relates to a multiplication accumulation device and in particular to a floating and fixed point multiplication and accumulation device suitable for VLSI implementation.

BACKGROUND OF THE INVENTION

High speed multiplier/accumulators are well known in the art and are typically used in signal processing systems and in special purpose Fast Fourier Transform (FFT) machines where emphasis is placed on high speed data processing. Although repeated multiply/accumulate operations are the most fundamental in digital signal processing, a problem exists in that they are the most time consuming. Thus, the limitation on the performance of the signal processing system is usually determined by the speed at which these operations can be performed. Because of throughput requirements and real time constraints it is not practical to implement these operations using a general purpose central processing unit (CPU). In the past, special high speed multiplier/accumulators were constructed on printed circuit (PC) boards using small and medium scale integrated circuit technology. However, a problem existed in that the resulting devices were bulky slow and expensive.

Due to advancements in integrated circuit technology, very large scale integrated circuit technology techniques (VLSI) have permitted hundreds of thousands of transistors to be implemented on a single chip. With the use of VLSI technology, the circuit density and performance of traditional multiplier/accumulators has increased whilst the cost thereof has decreased. However, the processing speed of conventional multiplier/accumulators is still unsatisfactory for certain applications. Thus, there still remains the need for a compact high speed multiplier/accumulator.

Accordingly, it is an object of the present invention to obviate or mitigate the above disadvantages by providing a novel multiplication and accumulation device.

SUMMARY OF THE INVENTION

According to the present invention there is provided a multiplication device for forming in two's complement form the product of first and second input binary numbers comprising:
- a numerical binary offset generation means generating a numerical binary offset of the value $X=(4-2^{-(N-1)})$ wherein N is a positive integer and corresponds to the bit length of said first and second input numbers;
- a partial product generating means receiving said first and second input binary numbers and generating therefrom first and second sets of partial products;
- a first addition means adding said binary offset and said first and second sets of partial products to express the result as a product sum portion and a product carry portion; and
- a second addition means adding said product sum portion and said product carry portion to form a resultant two's complement product.

By employing a numerical binary offset generation means it is possible to eliminate the conventional carry look ahead adder and therefore increase the speed of computation. Moreover, the product is expressed in two's complement form as required for further processing, thereby removing the ned for a two's complement conversion circuit.

In another aspect of the present invention there is provided a multiplication and accumulation device for forming the two's complement sum of the products of successive pairs of first and second input binary numbers, comprising:
- a numerical binary offset generation means generating a numerical binary offset of the value $X=(4-2^{-(N-1)})$ wherein N is a positive integer and corresponds to the bit length of said first and second input numbers;
- a partial product generating means receiving said first and second input binary numbers and generating therefrom first and second sets of partial products;
- a first addition means adding said binary offset and said first and second sets of partial products to express the result as a product sum portion and a product carry portion;
- an accumulation means including a first holding means to store in two's complement form the accumulation of products of previous pairs of binary numbers; and
- a second addition means adding said product sum and product carry portions and said accumulation of products to form a new two's complement accumulation of products.

BRIEF DESCRIPTION OF THE DRAWINGS

Embodiments of the present invention will now be described by way of example only with reference to the accompanying drawings in which:

FIGS. 6a and 6b illustrates timing diagrams of the devices shown in FIGS. 4 and 5;

FIG. 12A is a schematic view of a carry save adder implemented in the devices illustrated in FIGS. 4 and 5;

FIG. 12B is a schematic view of a portion of another adder device illustrated in FIGS. 4 and 5;

FIG. 18A is a schematic view of a barrel shifter implemented in the devices illustrated in FIGS. 4 and 5;

DETAILED DESCRIPTION OF THE INVENTION

Figure 1:
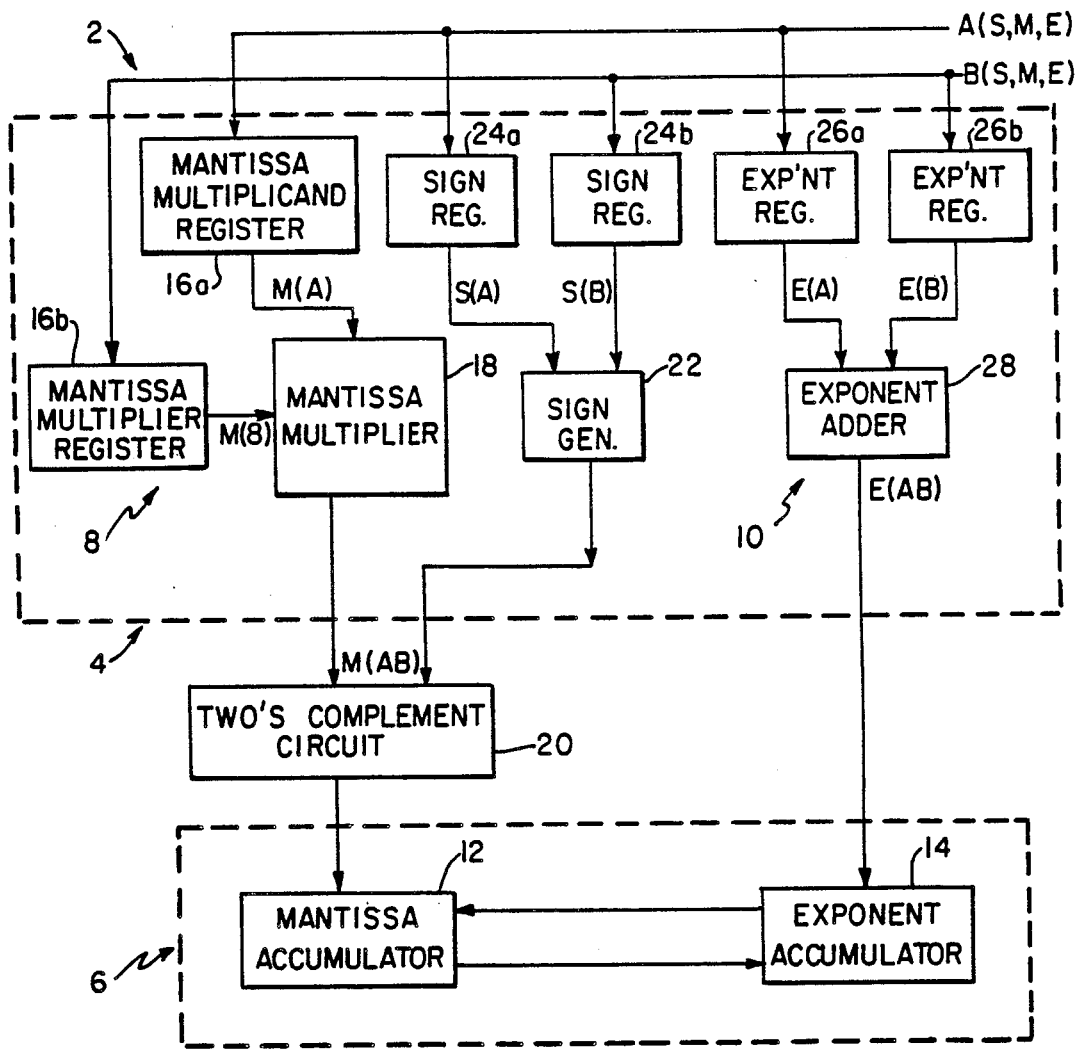
FIG. 1 is a schematic view of a conventional prior art multiplication and accumulation device.

Referring to FIG. 1, a conventional prior art multiplier/accumulator 2 is identified for multiplying a pair of binary numbers A and B, each of which has a mantissa M, a sign S and an exponent E. The multiplier/accumulator 2 includes a multiplication section 4 and an accumulation section 6. Multiplication section 4 includes a mantissa multiplication portion B comprising mantissa multiplicand register 16a for receiving the mantissa M(A) of binary number A and mantissa multiplier register 16b for receiving the mantissa M(B) of binary number B. Receiving inputs from registers 16a and 16b is mantissa multiplier 18 which generates a corresponding mantissa product M(AB) therefrom. The output from multiplier 18 is conveyed to a two's complement circuit 20 which in turn receives a control signal from sign generator 22. Sign generator 22 is connected to a pair of sign registers 24a and 24b each of which receives and stores the sign S(A), S(B) of one of the input numbers A and B, respectively.

Multiplication section 4 further comprises an exponent multipliCation portion 10 which includes a pair of exponent registers 26a and 26b for storing the exponent E(A), E(B) of the respective input operands A and B. Exponent registers 26a and 26b are coupled to an exponent adder 28 which generates the corresponding exponent E(AB) which is associated with the mantissa product M(AB). The output from both the two's complement circuit 20 and the exponent multiplication section 10 are directed to accumulation section 6 which comprises a mantissa accumulator 12 and an exponent accumulator 14 respectively.

Figure 2:
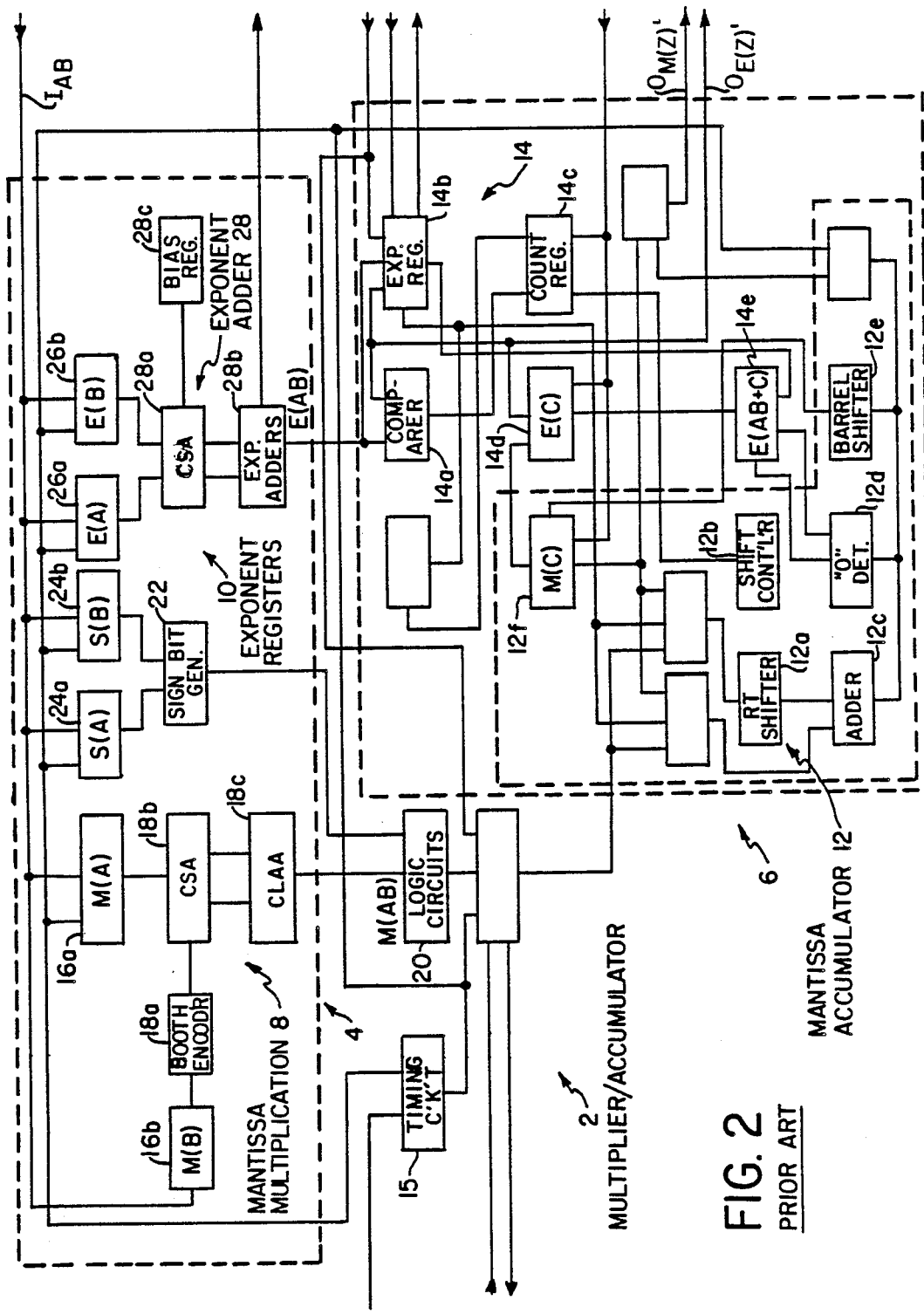
FIG. 2 is a schematic view illustrating further features of the conventional prior art device illustrated in FIG. 1.

Referring now to FIG. 2, a detailed schematic view of the traditional prior art multiplier/accumulator is shown having an input line $I_{AB}$ for receiving the input binary numbers A and B. The input line $I_{AB}$ is connected to the input/output registers 16a, 16b, 24a, 24b, 26a and 26b which receive and store the mantissa, the sign and the exponent of the two binary numbers A and B respectively. Connected to the mantissa registers 16a and 16b is the mantissa multiplier 8 comprising a modified Booth encoder 18a, a carry save adder (CSA) array 18b and a carry look ahead adder 18c. The traditional multiplier/accumulator also includes the sign bit generator 22 and the two's complement logic circuitry 20.

The exponent multiplier 10 receives input from the exponent registers 26a and 26b and includes an input exponent adder 28 comprising a carry save adder 28a, an exponent adder 28b and an exponent bias register 28c. The exponent adder 28 performs the required operations on the operand exponents E(A) and E(B) in order to acheive a correct product exponent E(AB).

The mantissa accumulator 12 accumulates the product mantissa M(AB) with previously formed and accumulated product mantissas M(C) stored in a register 12f. A register 14d stores the exponent E(C) associated with the accumulated mantissa M(C). The accumulator 12 comprises a right shifter 12a, a right shift controller 12b, a modified carry skip adder 12c and a mantissa register 12d. The exponent accumulator 14 includes an exponent comparer 14a, an exponent register 14b, a shift count register 14c and an exponent adder 14e. The accumulators 12 and 14 ensure that the mantissa product M(AB) is correctly accumulated with the previously accumulated products M(C) and that the resulting accumulation mantissa M(C)' has the correct associated exponent E(C)'.

The mantissa accumulator 12 further includes an overflow leading ones and zeros detector 12d and a barrel shifter 12e, which generate signals that are used to normalize the accumulation mantissa M(C)'. The exponent accumulator 14 includes an exponent adder 14e which receives the larger exponent of the two exponents E(AB) or E(C) also receives the signals from the overflow leading ones and zeros detector 12d and adjusts the larger exponent to form the normalized exponent E(C)' which corresponds with the normalized accumulation mantissa M(C)'. A timing circuit 15 is also included which provides clock pulses to the device 2, to control the synchronization of all circuit operations.

When two binary operands A and B are received on input line $I_{AB}$, the mantissas, signs and exponents thereof are applied to the respective input/output registers. In order to generate a correct product result, the multiplication procedure requires the product of the two mantissas to be formed and the sum of the two exponents to be formed. Thus, the mantissa and exponent operations are performed separately.

The operand mantissas M(A) and M(B) are applied to the parallel mantissa multiplier 8 and the product thereof is performed. The multiplication architecture comprises two major sections, the first of which is the generation of partial products and the second of which is the summation of the partial products. Many algorithms have been in existence to generate these partial products and to reduce the summation time thereof. The conventional multiplier/accumulator 2 employs a variation of a modified Booth's algorithm to reduce the number of partial products generated in the multiplication process.

The Booth encoder 18a encodes the mantissa M(B) of the multiplier 8 into a number of codes and applies the results to the CSA array 18b wherein the corresponding partial products are generated. Following this, the CSA array 18b performs a high speed addition of the partial products and outputs a product sum and a product carry result. These results are fed to a carry look ahead adder (CLAA) 18c where the final mantissa product M(AB) is formed. However, the use of the carry look ahead adder 18c decreases the processing speed of the entire device 2 due to the complexity thereof.

The product result M(AB) is converted into two's complement form prior to being applied to the mantissa accumulation stage 12 by the two's complement circuit 20. A fast two's complement technique is used which detects the least significant non-zero bit of the product and inverts all the bits to the left thereof. However, this two's complement conversion technique increases the required processing time of the device 2. With both the mantissa product M(AB) and the accumulation mantissa M(C) in two's complement form, a simple addition between the results is performed to generate a new two's complement accumulation mantissa M(C)'.

In the exponent multiplication section 10, the contents of exponent registers 26a and 26b are added and a bias stored in exponent bias register 28c is subtracted therefrom via a carry save adder (CSA) 28a. The CSA adder 28a forms a sum and a carry output which in turn are applied to exponent adder 28b which forms the correct exponent E(AB) that is associated with the mantissa product M(AB). The exponent E(C) that is associated with the accumulation mantissa M(C) is stored in exponent accumulator register 14d. The accumulation exponent E(C) and the exponent E(AB) generated by exponent adder 28b are compared by exponent comparer 14a. The larger of the two exponents is stored in an exponent register 14b and the difference therebetween is stored in a shift count register 14c.

To ensure correct addition of the mantissa product M(AB) and the accumulation mantissa M(C), the mantissa product M(AB) or the accumulation mantissa M(C) with the smaller corresponding exponent associated therewith, is right-shifted via right shifter 12a by the difference stored in the shift count register 14c. After the alignment is performed, the accumulation mantissa M(C) and product mantissa M(AB) are added in a modified carry skip adder 12c to form a new accumulation mantissa M(C)'.

If the product mantissa and accumulation mantissa have the same sign, overflow or underflow may occur. If overflow occurs, the new accumulation mantissa M(C)' is right-shifted to put it back in range and the exponent E(C)' is incremented accordingly. If the mantissa operands have different signs, cancellation of significant bits may occur thereby yielding an unnormalized result. Normalization is performed on the new accumulation mantissa M(C)' using a leading zeros and ones detector 12d and an N-bit left or barrel shifter 12e. Following this, the exponent is checked for overflow or underflow. If either occurs, the appropriate constants are generated for the new accumulation mantissa M(C)' and exponent E(C)' and status bits are set. Finally the normalized accumulation mantissa M(C)' and exponent E(C)' are stored in accumulation registers 12f and 14d respecttively and the result is outputted via output lines OM(C)' and OE(C)'.

Figure 3:
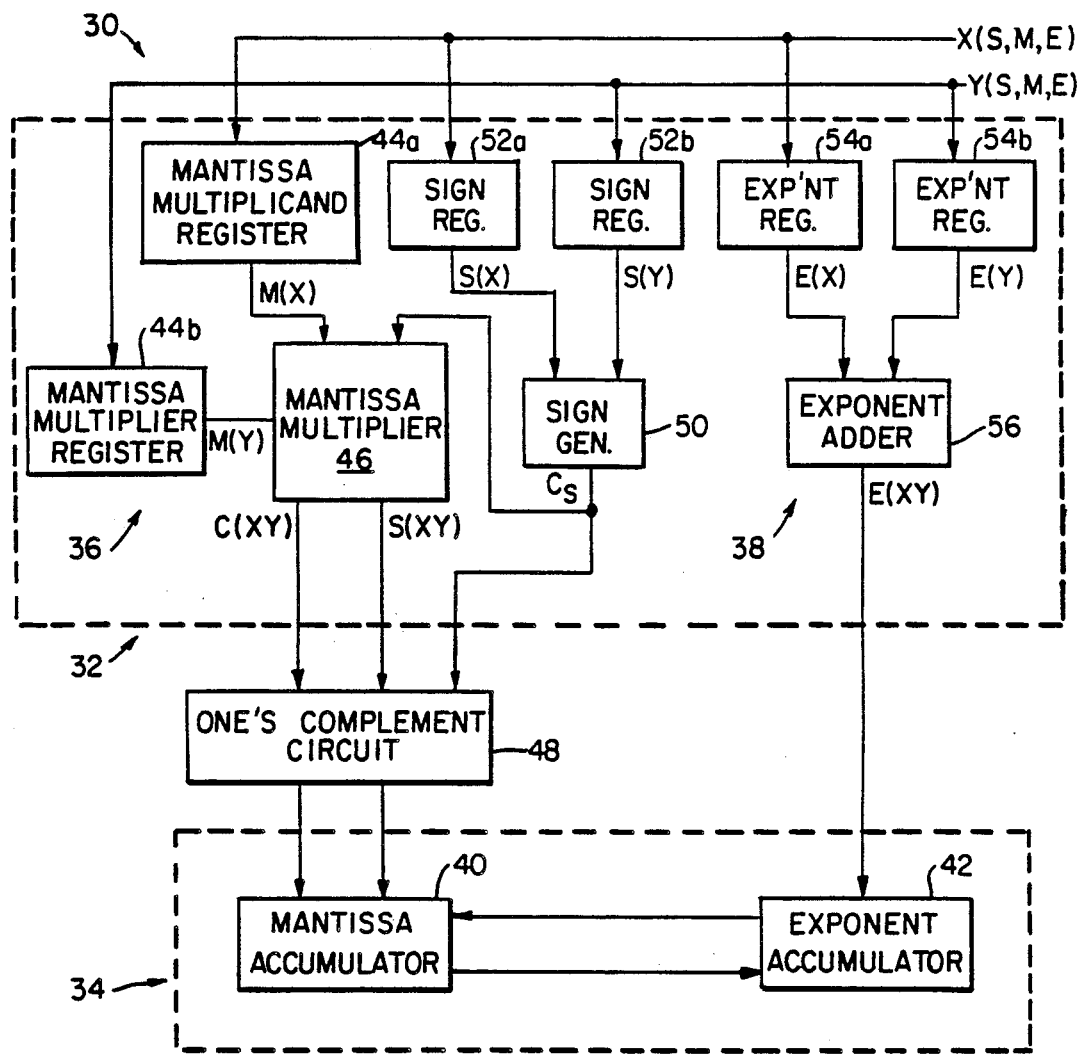
FIG. 3 is a schematic view of the present multiplication and accumulation device.

Referring to FIG. 3, the present multiplier/accumulator 30 is shown for multiplying two input binary operands X and Y each of which has a mantissa M, a sign S and an exponent E, to form a mantissa product M(XY) and an associated exponent E(XY). Furthermore, the device 30 accumulates the product results M(XY) and E(XY) with an accumulation of products M(Z) previously formed therein, thereby resulting in a new accumulation of products M(Z)' having a corresponding exponent E(Z)'. Similar to the conventional multiplier/accumulator 2 illustrated in FIGS. 1 and 2, the present device 30 includes a multiplication section 32 and an accumulation section 34, the accumulation section 34 of which comprises a mantissa accumulator 40 and an exponent accumulator 42.

Multiplication section 32 includes a mantissa multiplication section 36 comprising mantissa registers 44a and 44b and a mantissa multiplier 46 which receives an input from each of the registers 44a and 44b respectively. The multiplier 46 forms sum S(XY) and carry C(XY) outputs and applies them to a one's complement circuit or inverter/non-inverter 48, the circuit 48 of which also receives a control signal Cs from a sign generator 50. Sign generator 50 has sign registers 52a and 52b connected thereto, each register of which receives the sign S(X), S(X) of one of the operands X and Y respectively.

Multiplication section 32 further includes an exponent multiplication section 38 comprising exponent registers 54a and 54b and an exponent adder 56 which collectively function in a similar manner as the exponent multiplication section 10 found in the conventional device 2 illustrated in FIGS. 1 and 2. The sum and carry output from the one's complement circuit 48 and the output from the exponent multiplication section 38 are applied to a mantissa accumulator 40 and an exponent accumulator 42 respectively, both of which are located in accumulation section 34. The accumulators 40 and 42 function in a similar manner as the accumulators 12 and 14 of the traditional device 2 and thus, provide an accumulation of products having a corresponding exponent. Furthermore, the mantissa and exponent accumulators 40 and 42 convey adjustment signals therebetween in order to ensure that the accumulation results M(Z)' and E(Z)' are correct.

To increase the computation or throughput rate of the multiplier/accumulator 30, the technique of pipelining is used. One approach for achieving fast rates using pipelining is to increase the number of stages into which the processing unit is segmented. However, increasing the number of segments not only requires more latches but also increases the latency time. Generally, multiplier/accumulators are used within larger digital signal processors where sequences of operations are performed without interruption. Thus, the latency time must be minimized thereby setting a limit on the number of pipelining stages. As shown, the present device 30 uses a two-phase pipeline process to increase device performance, one pipeline of which is for the mantissa multiplication and accumulation process and the other pipeline of which is for the exponent product and accumulation process.

To improve the operational speed and reduce the hardware overhead of the conventional multiplier/accumulator 2, the mantissa multiplier 46 of the present device 30, employs an offset generation means and eliminates the use of the conventional carry look ahead adder by allowing the product sum and product carry results generated by the multiplier 46 to propagate to the accumulation section 34. The final summation of the multiplier outputs is performed in the accumulation section 34 to form the mantissa product M(XY). The use of a two's complement data representation within the accumulation stage 34 requires additional circuitry to convert the mantissa multiplication product sum and carry terms into two's complement form. The tailing ones and zeros detection scheme used in the two's complement circuit 20 of the conventional device 2 illustrated in FIGS. 1 and 2 is not easy to implement due to the complexity and irregularity thereof. Thus, in order to reduce the circuit complexity and increase performance, the one's complement scheme implementing the inverter/non-inverter 48 and the multiplier 46 employing the offset generation is used.

The offset generation scheme is based on the following:

Consider the following unsigned binary number, where S is the Sum term, C is the Carry term and M=(S+C) is the final mantissa product result:

$$S = \sum_{i=0}^{i=-(N-2)} a_i 2^i;$$

$$C = \sum_{i=0}^{i=-(N-2)} b_i 2^i;$$

$$(S+C) = \sum_{i=1}^{i=-(N-2)} p_i 2^i$$

and derive the Boolean equation as follows.

(i) In two's complement form, the sum result -(S+C) can be represented as 4-(S+C).
(ii) In one's complement form, the sum result -(S+C) can be represented as $[(4-2^{-(N-2)})-S]+[(4-2^{-(N-2)})-C]$.
(iii) The difference between the two's complement and one's complement representation of -(S+C) is:

$$[(4-2^{-(N-2)})-S]+[(4-2^{(N-2)})-C]-[4-(S+C)]=4-2^{-(N-1)}$$

Hence $$4-(S+C)=4-[S+(4-2^{-(N-1)})-C]$$

and therefore, $$4-(S+C)=[(4-2^{-(N-2)})-[S+(4-2^{-(N-1)})]]+[(4-2^{-(N-2)})-C]$$

Now, if the term $S+(4-2^{-(N-1)})$ is represented by S', the resulting equation is in the form:

$$4-(S+C)=[(4-2^{-(N-2)})-S']+[(4-2^{-(N-2)})-C].$$

However, it should be realized that the final result $[(4-2^{-(N-2)})-S']+[(4-2^{-(N-2)})-C]$ is the one's complement of $-(S'+C)$.

Thus, the two's complement representation of the product M(XY) can be formed by adding an offset value equal to $(4-2^{-(N-1)})$ to the product sum S(XY) term; taking the one's complement of both the $[S(XY)+(4-2^{(N-1)})]$ term and the product carry C(XY) term and adding both of these one's complement results, this procedure results in a two's complement mantissa product result-M(XY). To form the positive two's complement result, the resultant product term -M(XY) must be inverted.

The multiplication and accumulation schemes implemented in the prior art device 2 and the present device 30 are illustrated in the following examples:

EXAMPLE 1

In the conventional device, the multiplier 18 generates a product sum term S(AB) and a product carry term C(AB) and performs an addition therebetween to form a mantissa product result M(AB). If the previously formed accumulation mantissa result is represented as M(C), then the new accumulation mantissa result is given as M(C)+M(AB)=M(C)'. Let S(AB)=00.11011, C(AB)=01.01110 and M(C)=01.01000.

In the conventional device, the sum and carry terms are added as follows:

```
   S(AB)    00.11011
 + C(AB)    01.01110
   M(AB)    10.01001
```

However the product mantissa M(AB) result is not in two's complement form.

Thus, by using two's complement logic circuit 20, the two's complement -M(AB) thereof is produced and added to the accumulation mantissa M(C).

```
  -M(AB)    01.10111
 +  M(C)    01.01000
    M(C)'   10.11111
```

This procedure produces the correct two's complement mantissa accumulation result M(C)'. However, the complex two's complement circuitry 20 is required.

EXAMPLE

The scheme of the present device 30 uses multiplier 46 to generate an offset value equal to the value $X=[4-2^{-(N-1)}]$, the value of which is added to the product sum path in the partial product addition. Let S(XY)=00.11011, C(XY)=01.01110 and M(Z)=01.01000.

```
              S(XY)             00.11011
 + OFFSET[4-2^-(N-1)]           11.11110
   S(XY)+[4-2^-(N-1)]  =       100.11001
```

Using inverter/non-inverter 48, the one's complement of both $(S(XY)+[4-2^{-(N-1)}]$ and C(XY) terms are taken and are added together with the accumulation mantissa M(Z).

```
 - S(XY)+[4-2^-(N-1)]    011.00110
 - C(XY)                  10.10001
 +  M(Z)                  01.01000
    M(Z)'                110.11111
```

Thus, a two's complement representation of the mantissa product sum S(XY) and product carry C(XY) terms generated by multiplier 46 can be formed using the offset value and the one's complement technique as shown to form a two's complement product. The two's complement product can then be added to the accumulation of previously formed products to form the new accumulation of products.

Figure 7:
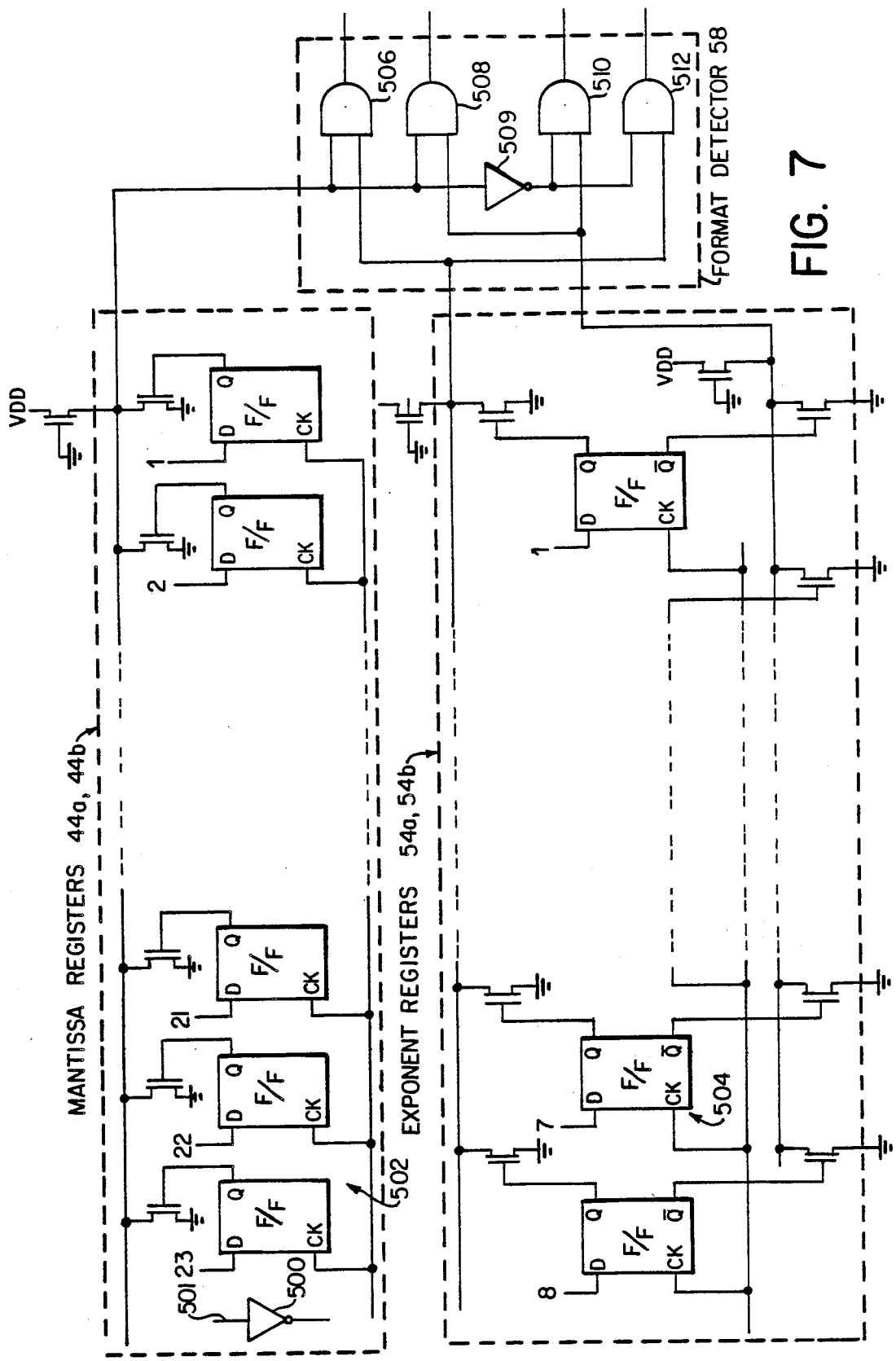
FIG. 7 is a schematic view of input registers implemented in the devices illustrated in FIGS. 4 and 5.

Referring now to FIGS. 4 to 20, an embodiment of the device 30 illustrated in FIG. 3 is better illustrated. As can be seen, the mantissa registers 44a and 44b, the exponent registers 54a and 54b and the sign bit registers 52a and 52b have an input line $I_{XY}$ connected thereto. The input line $I_{XY}$ receives the input binary operands X and Y thereon and applies the mantissas, signs and exponents thereof to the appropriate registers. One of the mantissa registers 44a, 44b is shown in FIG. 7 and, as can be seen, the mantissa registers 44a and 44b each comprise an inverter 500 supplied with a "low" voltage signal from an input ground 501 and a 23-stage master/slave D-type flip-flop array 502. This allows the mantissa registers 44a and 44b to hold the appropriate 24-bit mantissa of the multiplier Y and the multiplicand X, the first 23 bits of which are received from input line $I_{XY}$ and the 24th-bit implicit "1" of which is generated by the inverter 500.

One of the exponent registers 54a, 54b is also shown in FIG. 7. The exponent registers 54a and 54b each comprise an 8-stage master/slave D-type flip-flop array 504 and store the appropriate 8-bit exponent of the multiplier Y and the multiplicand X respectively.

The contents of the mantissa multiplicand register 44a and exponent multiplicand register 54a are applied to a format detector 58. The format detector as shown in FIG. 7 comprises a series of logic gates including AND gates 506, 508, 510 and 512 as well an inverter 509 which are used to detect certain combinations of multiplicand exponent and mantissa values. Similarly the output of the mantissa multiplier register 44b and exponent multiplier register 54b are applied to the format detector 58. When any of the predetermined combinations of mantissa and exponent values are detected in either of the multiplicand X registers 44a and 54a or the multiplier Y registers 44b and 54b, appropriate register flags are generated.

Figure 4:
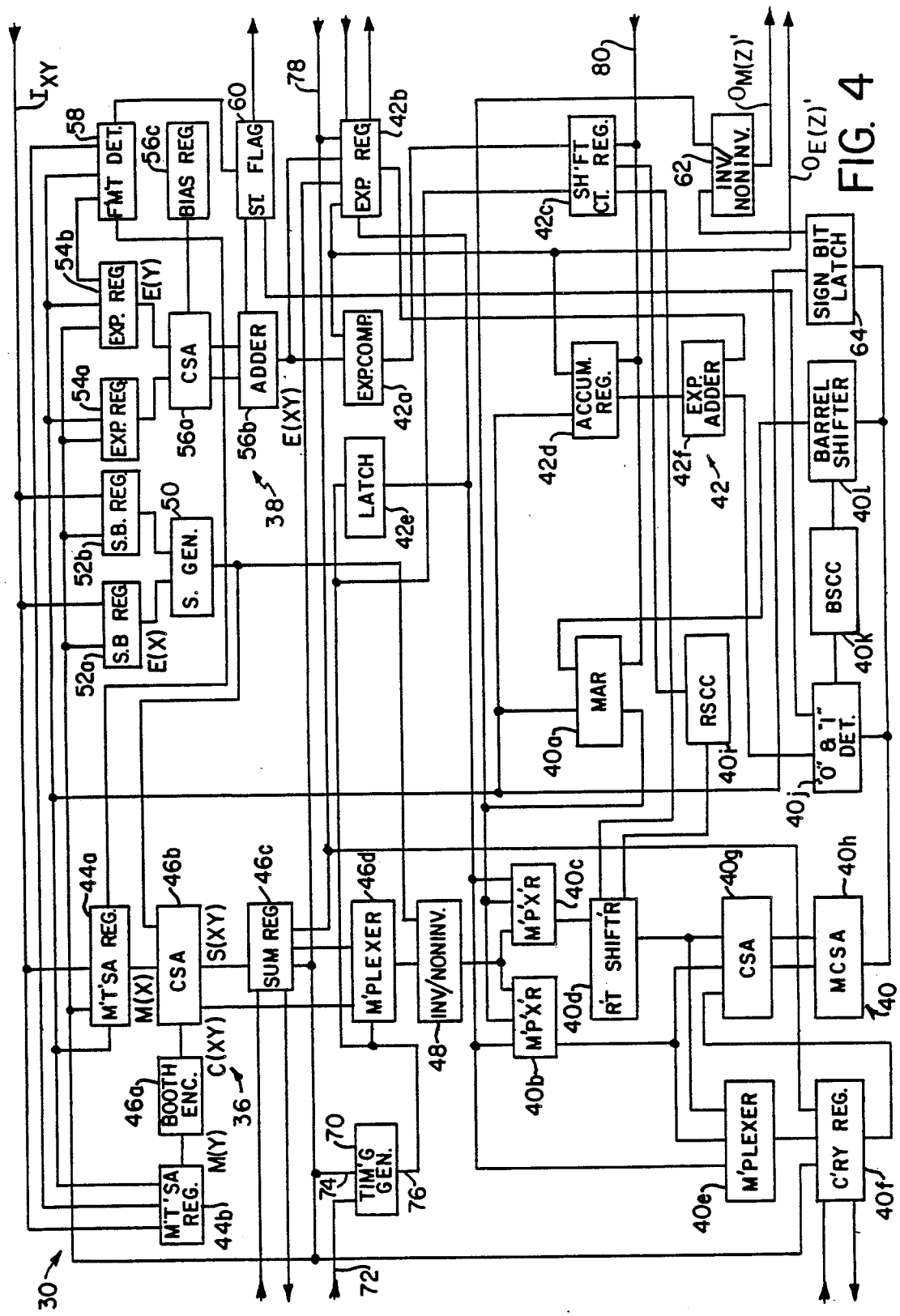
FIG. 4 is a schematic view illustrating further features of the device illustrated in FIG. 3.
Figure 5:
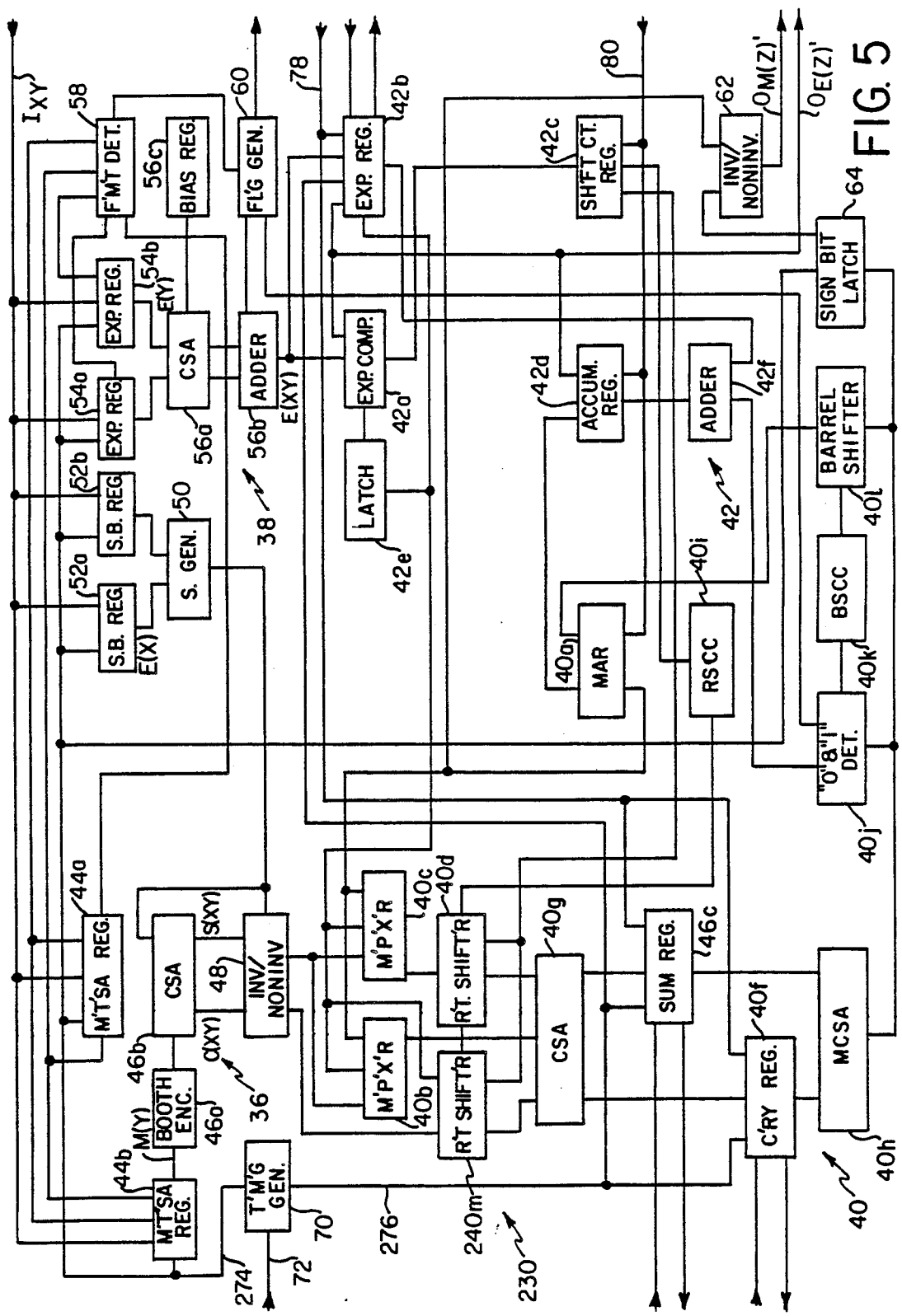
FIG. 5 is another embodiment of the device illustrated in FIG. 3.

A status flag generator 60 illustrated in FIG. 4, having format detector 58 connected thereto, receives the register flags and generates appropriate status flags, thereby informing the device 30 of incorrect input data. When a status flag i s generated the device 30 ignores the operands X and Y and thus, prevents incorrect data from being processed and accumulated with the previously stored data.

The multiplier mantissa M(Y) stored in the multiplier mantissa register 44b is applied to the modified Booth encoder 46a which comprises twelve decoder circuits 520. The Booth encoder 46a and one of the decoder circuits 520 are illustrated better in FIGS. 9A and 9B, respectively. The modified Booth encoder 46a implements a modified Booth's algorithm by encoding the 24-bit mantissa into 12 sets of 3-bit codes, the method of which is set out in more detail hereinafter. Referring to FIG. 10, A-5 the carry save adder (CSA) array 46b is shown. The array 46b receives the codes generated by the modified Booth encoder 46a and the multiplicand mantissa M(X) from the mantissa register 44a and performs a multiplication therebetween. As can be seen, the CSA array 46b is in the form of a twelve row by twenty-seven column array, the top two rows of which comprise only selector/complementors 550 (FIG. 10E), the third column of which comprises half adders 551 and the remaining row elements of which are either full adders or conditional full adders 552 (FIG 10B) 553 (FIG. 10D) respectively. One of the selector/complementors 550 (FIG. 10E), half adders 551 (FIG. 10C), full adders 552 (FIG. 10B) and conditional full adders 553 (FIG. 10D) are also shown.

The CSA array 46b provides two outputs one of which is a 32-bit product sum term S(XY) that is fed to a sum register 46c. The sum register 46c is illustrated in FIG. 11B and comprises a 32-stage master/slave D-type flip-flop array 555. The other output of the CSA array 46b is a 32-bit product carry term C(XY) that is conveyed to a multiplexer 46d illustrated in FIG. 8A. The sum register 46c stores the product sum term S(XY) so that it may be examined at an intermediate time during the multiply/accumulate process. The multiplexer 46d which is well known in the art, also receives the output from sum register 46c (FIG. 11B) thereby allowing the product sum S(XY) and product carry C(XY) terms to be transmitted via a single conductor at a faster rate.

Figure 8A:
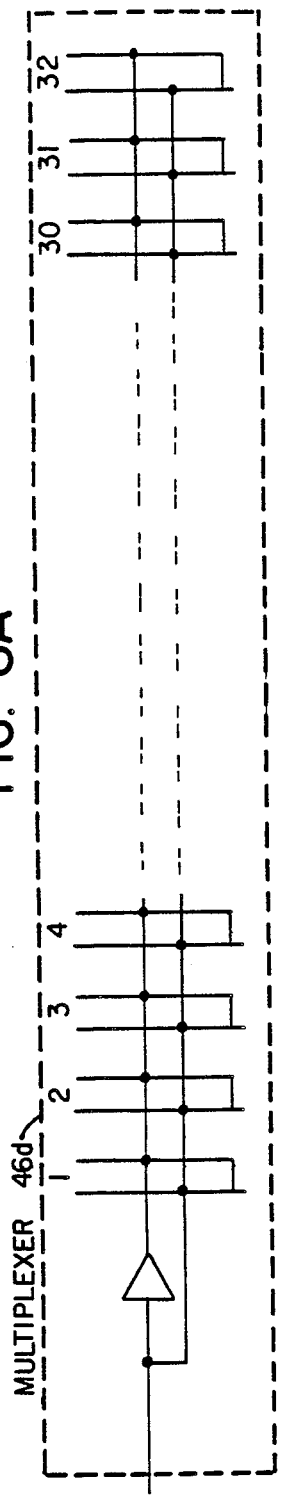
FIGS. 8A and 8B are schematic views of a multiplexer and invertor, respectively, implemented in the devices illustrated in FIGS. 4 and 5.
Figure 8B:
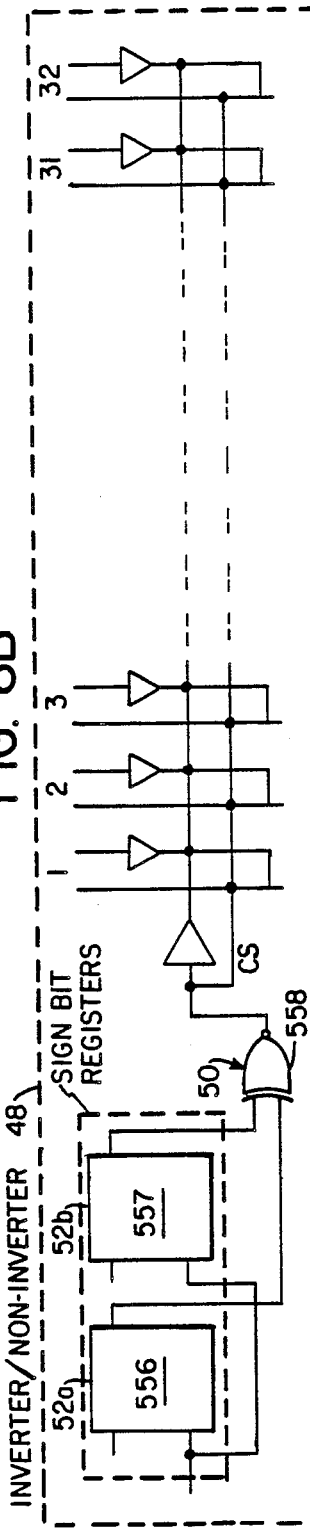
Figure 9B:
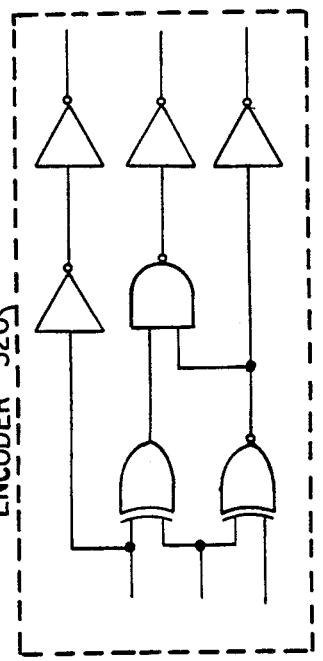
FIGS. 9A and 9B are schematic views of a decoder and modified Booth encoder, respectively implemented in the devices illustrated in FIGS. 4 and 5.
Figure 9A:
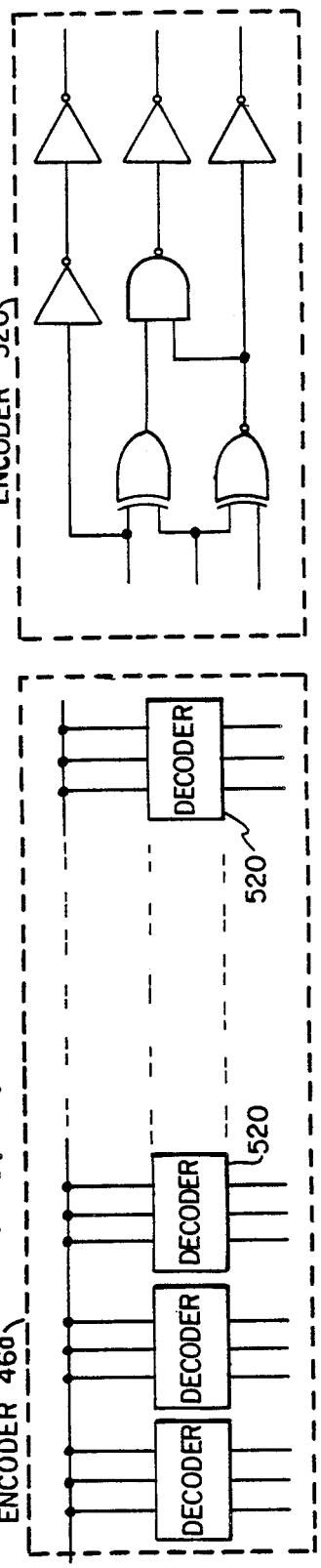

Referring to FIG. 8B, sign bit registers 52a and 52b each comprise a single master/slave D-type flip-flop 556 and 557 respectively. The outputs therefrom are applied to the sign generator 50, which comprises a single EXOR gate 558 The control signal formed therein is applied to the CSA array 46b for use in generating the binary offset value and to the one's complement circuit or inverter/non-inverter 48 for use in forming the proper two's complement. Inverter/non-inverter 48 is also illustrated in FIG. 8B and receives the output from the multiplexer 46d. Thus, the inverter/non-inverter 48 receives the 32-bit product sum S(XY) and product carry C(XY) terms from the CSA array 46b.

Figure 11A:
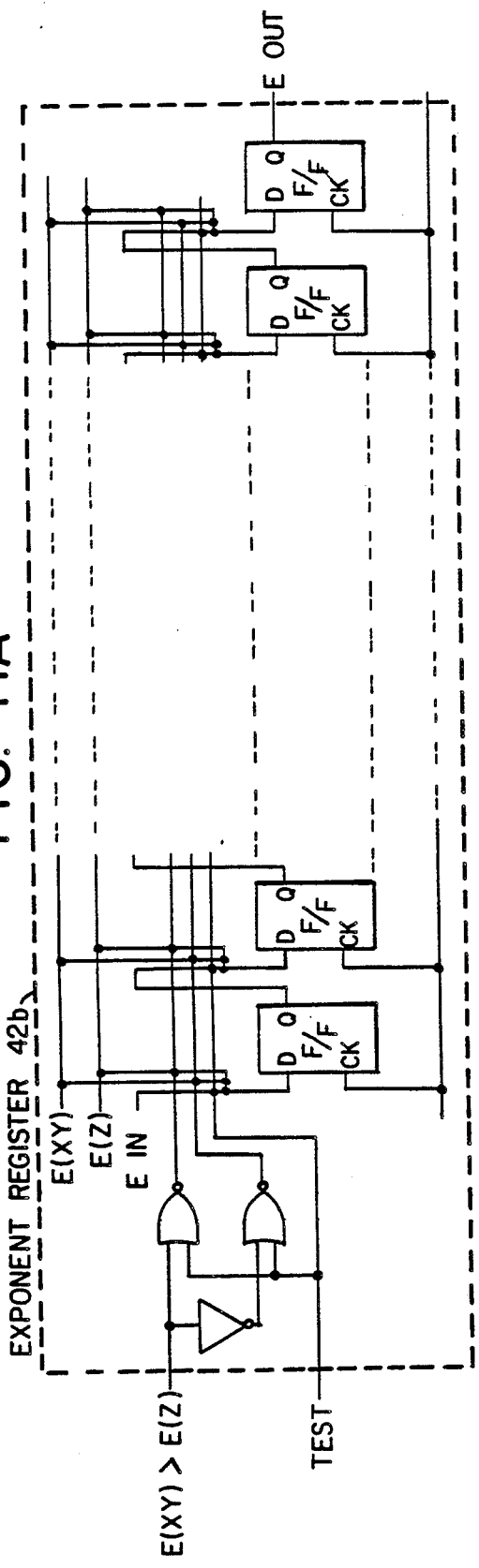
FIGS. 11A and 11B are schematic views of an exponent register and a sum carry register, respectively implemented in the devices illustrated in FIGS. 4 and 5.
Figure 11B:
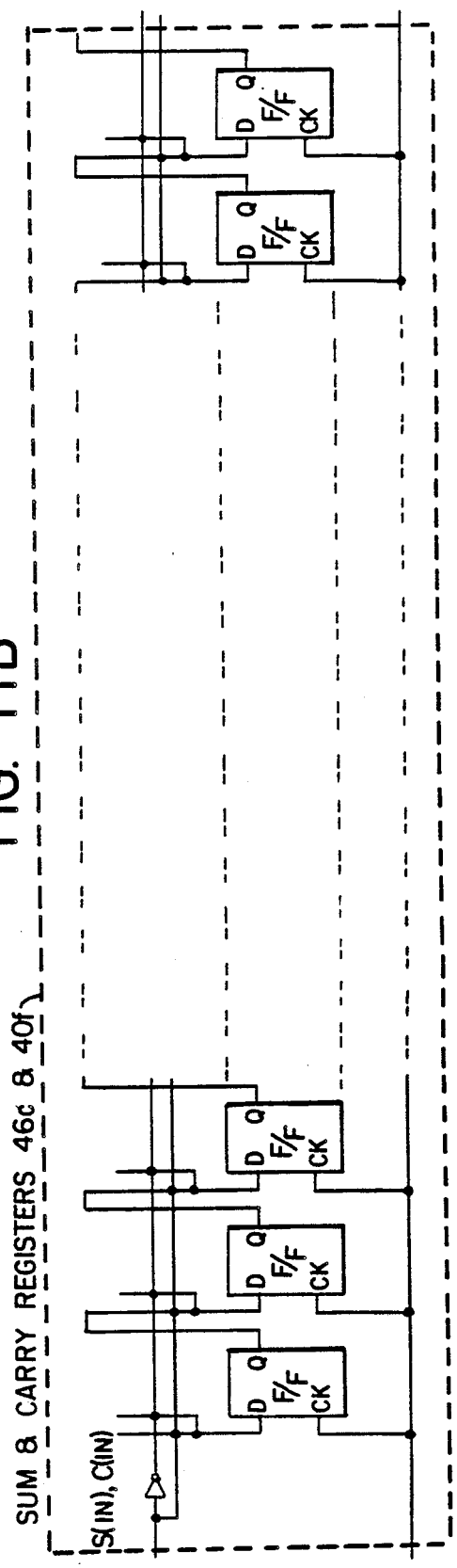

The output from the inverter/non-inverter 48 (FIG. 8B) is applied to multiplexers 40b and 40c which also receives an input from a 32-bit mantissa accumulation register (MAR) 40a and an information signal from an 8-bit exponent register 42b illustrated in FIG. 11A. Similar to the other registers found in the present device 30, the exponent register 42b shown in FIG. 11 comprises an 8-stage master/slave D-type flip-flop array 559.

Figure 13:
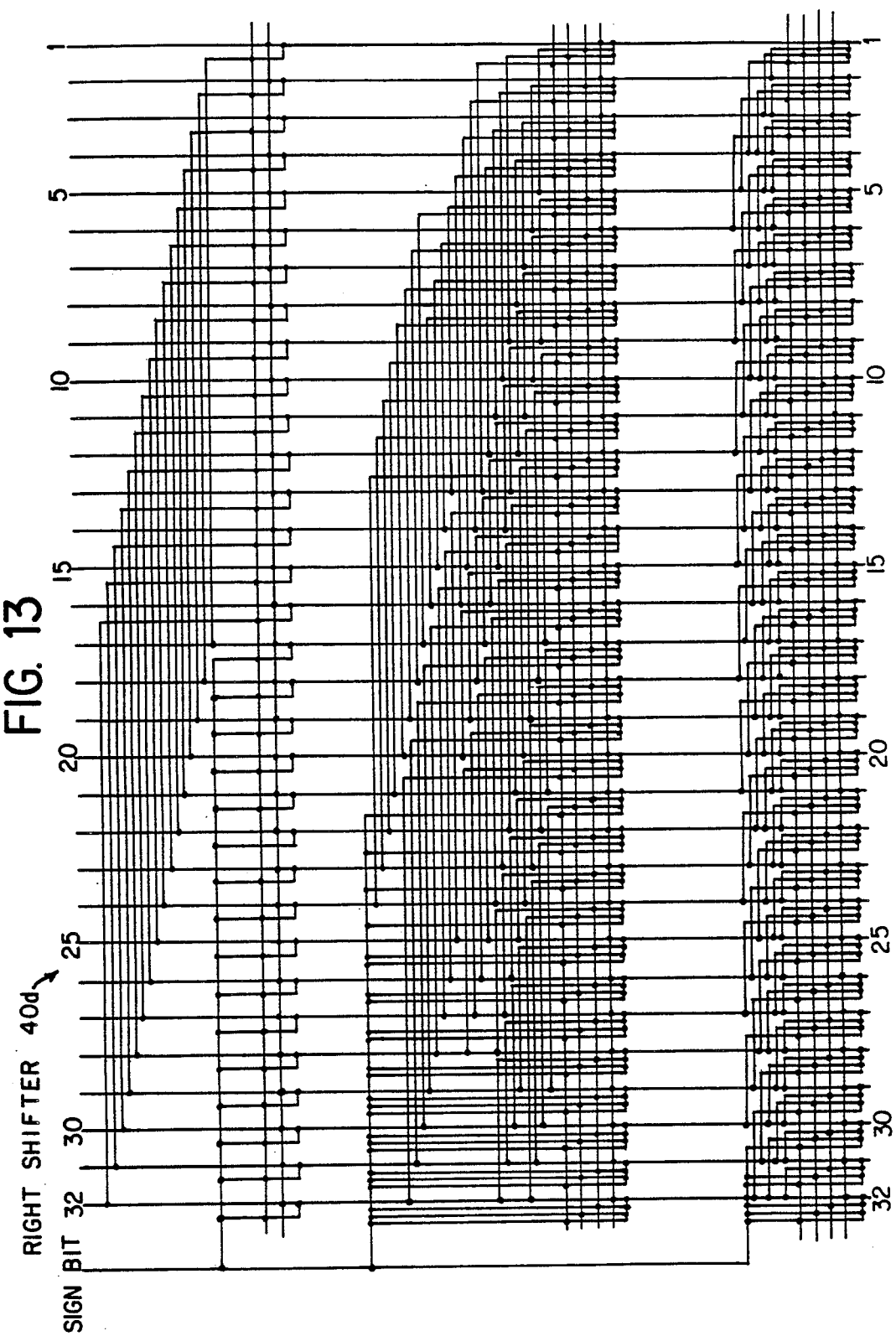
FIG. 13 is a schematic view of a right shifter with a sign extension implemented in the devices illustrated in FIGS. 4 and 5.
Figure 14:
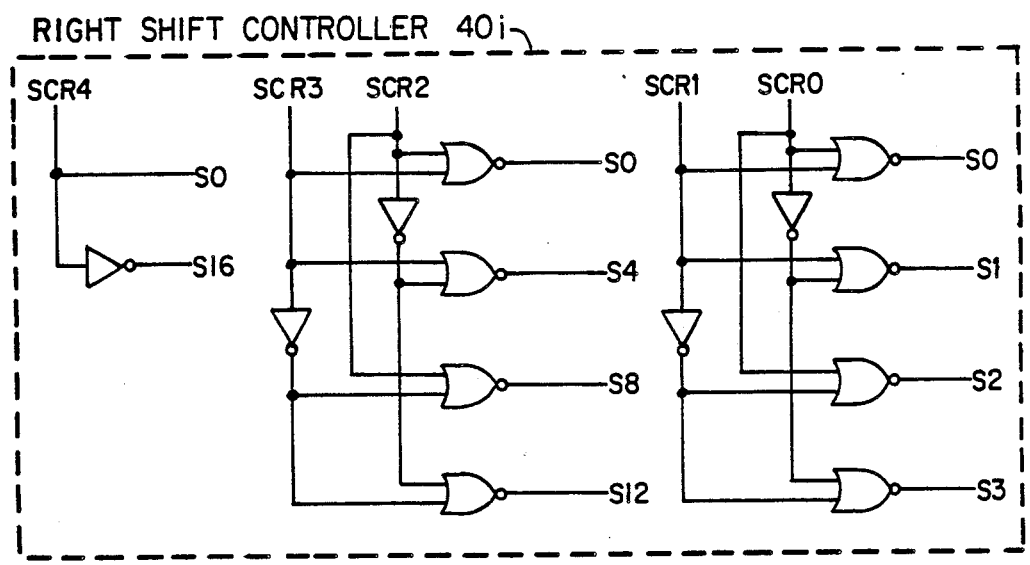
FIG. 14 is a schematic view of a controller for the portion illustrated in FIGS. 4, 5 and 13.

A right shifter 40d receives an input from the multiplexer 40c and is controlled by a right shift count controller (RSCC) shown in FIG. 14 40i. The right shifter 40d as shown in FIG. 13 is partitioned into three stages. Since the silicon area occupied by the right shifter 40d is dominated by interconnector lines rather than bit-cells, the three stage partitioning reduces the silicon area thereof. The first stage shifts either 0 or 16 bits at a time to the right, the second stage shifts either 0, 4, 8 or 12 bits at a time to the right and the third stage shifts either 0, 1, 2 or 3 bits at a time to the right, thereby forming a 0 to 32-bit right shifter. This scheme reduces the number of transmission gates therein from $[(1+32)*32/2]$ as found in a single stage shifter to $[(2+4+4)*32]$ as found in the present right shifter 40d. The shift control logic circuit 40i (FIG. 14), which is well known in the art, is easy to implement since the right shifter performs "power of two shifts".

The output from the right shifter 40d is applied to a carry save adder (CSA) 40g and a multiplexer 40e. The multiplexer 40e also receives inputs from the multiplexer 40b and an exponent register 42b. The output from the multiplexer is applied to a carry register 40f. The carry register 40f is identical to the sum register 46c shown in FIG. 11B and comprises a 32-stage master/slave D-type flip-flop array 555. The carry register 40f allows the product carry term C(XY) to be examined during multiply and accumulate operations.

Figure 16A:
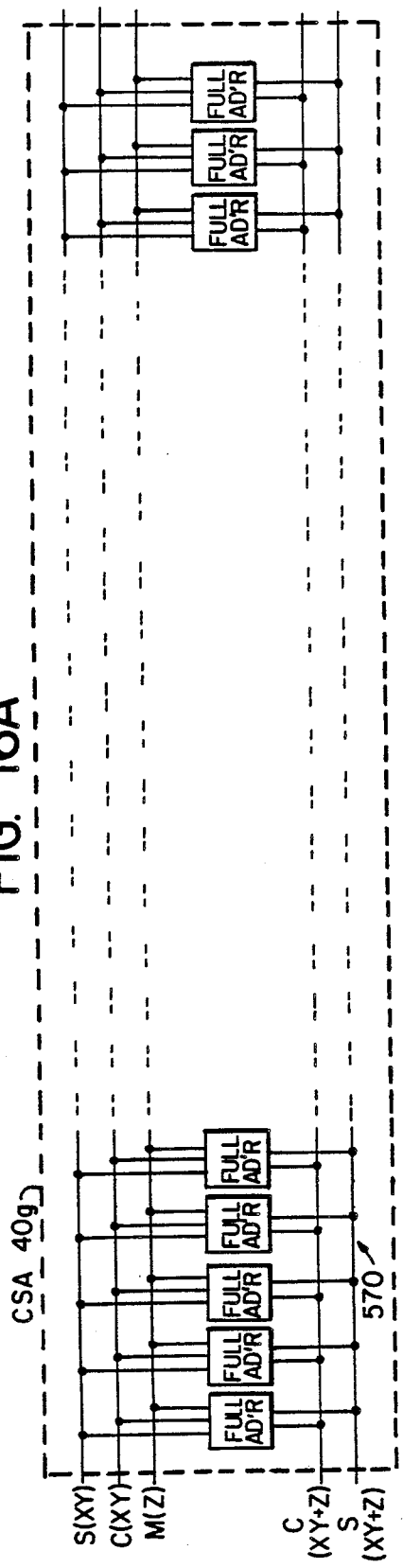
FIG. 16A is a schematic view of a save adder (CSA) implemented in the devices illustrated in FIGS. 4 and 5.

The CSA 40g is illustrated in FIG. 16A and comprises a 34-stage full adder array 570 which receives input data from the multiplexer 40b, the carry register 40f and the right shifter 40d. Thus, the adder 40g performs an addition between the product sum term S(XY), the product carry term C(XY) and the accumulation mantissa M(Z) respectively to form a new accumulation sum term S(XY+Z) and a new accumulation carry term C(XY+Z). These results are conveyed to a modified carry skip adder (MCSA) 40h wherein a 35-bit accumulation result M(Z)' is formed. The modified carry skip adder 40h, which is well known in the art, is better shown in FIG. 16B as well. The modified carry skip adder 40h comprises two full adders 571, a 2-stage ripple-carry adder 572, two 3-stage ripple-carry adders 573, two 4-stage ripple-carry adders 574, two 5-stage ripple-carry adders 575 and a 6-stage ripple-carry adder 576. The six-stage ripple-carry adder 576 is better illustrated in FIG. 16C. As can be seen, the ripple-carry adder 576 includes six ripple adders 577 and an invertor 578.

Figure 10A:
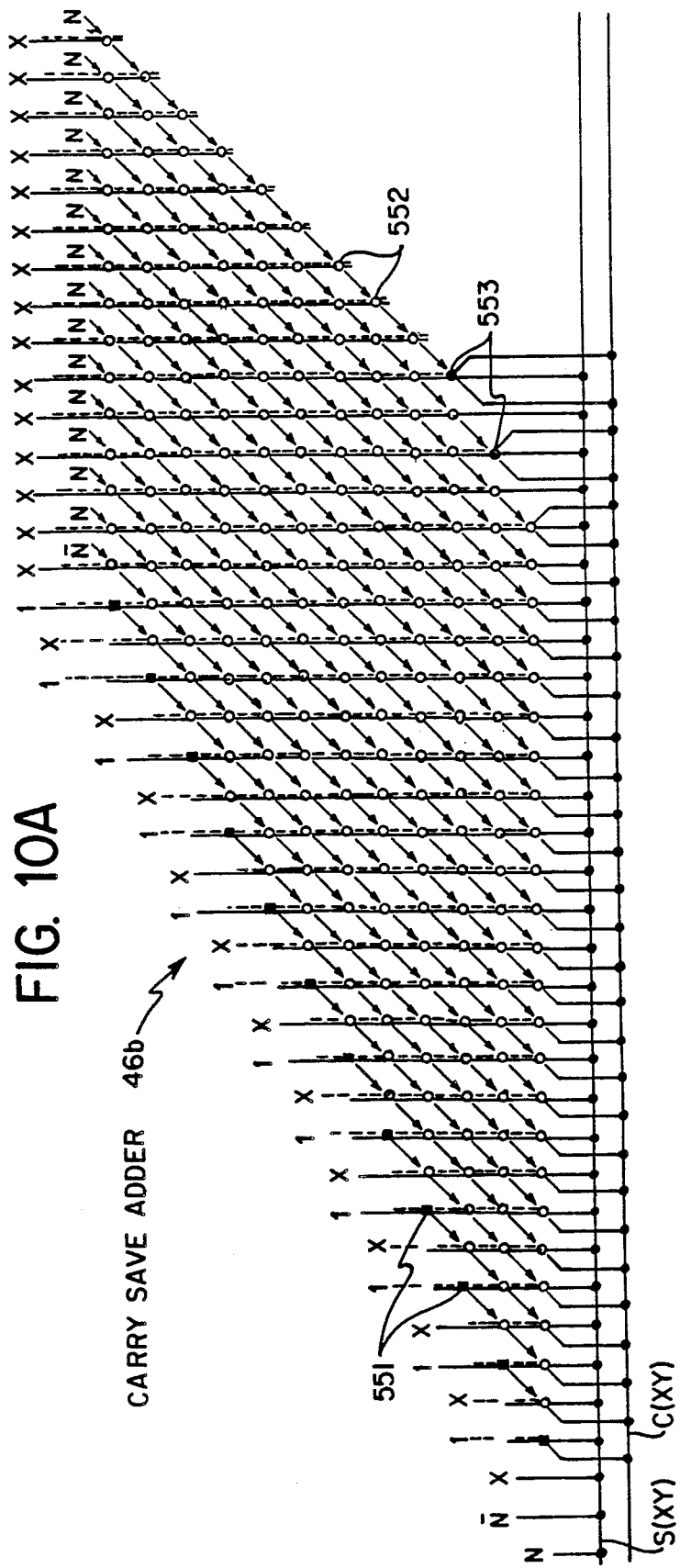
FIG. 10A is a schematic view of a carry save adder array implemented in the devices illustrated in FIGS. 4 and 5.
Figure 10B:
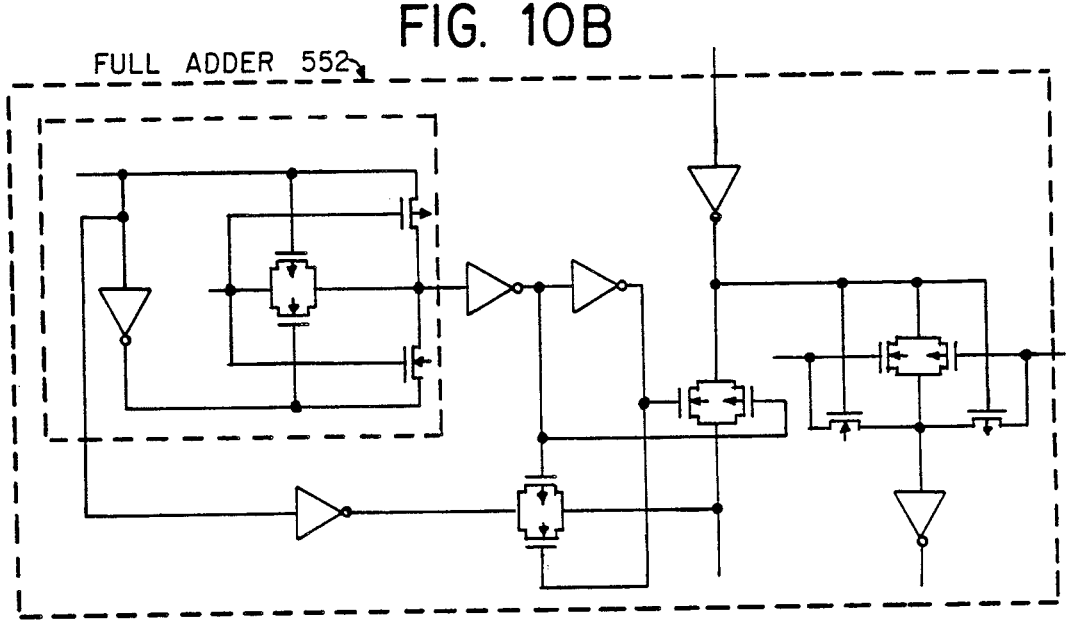
FIGS. 10B–10E are schematic views of a full adder, half adder, conditional full adder and selector/complementor, respectively, in the devices illustrated in FIGS. 4 and 5.
Figure 10C:
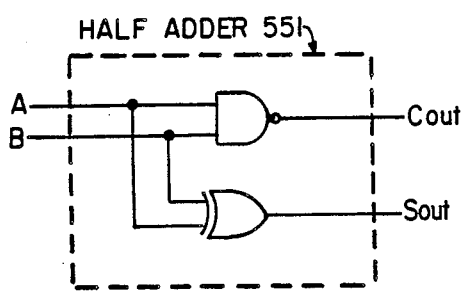
Figure 10D:
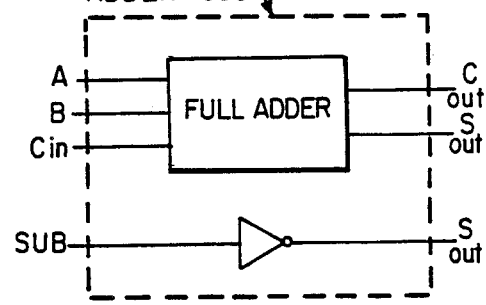
Figure 10E:
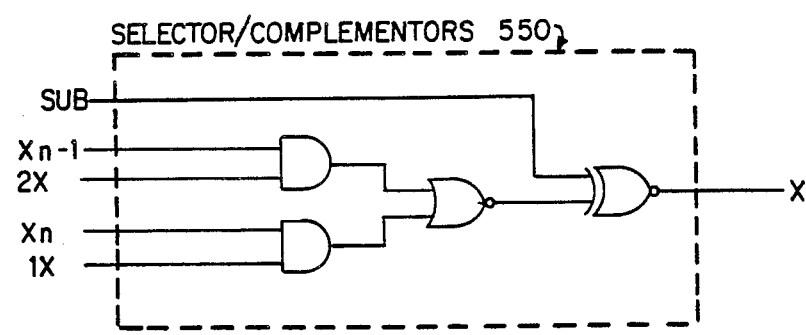
Figure 12C:
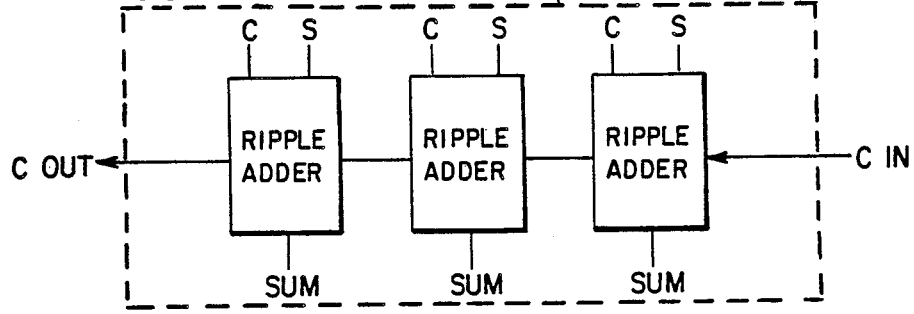
FIGS. 12C and 12D are schematic views of a three stage ripple adder and a ripple adder, respectively, in the device shown in FIG. 12B.
Figure 12D:
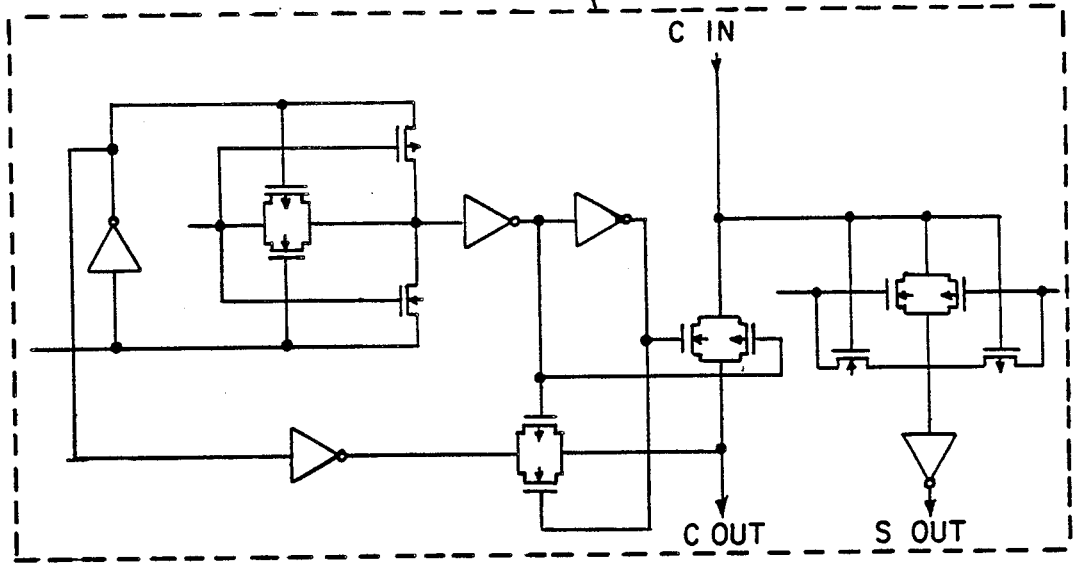

The output from the exponent registers 54a and 54b and the output from an exponent bias register 56c are applied to a carry save adder (CSA) 56a. The carry save adder 56a is better illustrated in FIG. 12A and performs an addition between the received values and forms an 8-bit exponent sum term S(E(XY)) and an 8-bit exponent carry term C(E(XY)). The CSA 56a, which is known in the art, comprises two full adders 581 and six half adders 582 respectively. A full adder 552 and a half adder 551 are illustrated in FIGS. 10B and 10C, respectively. Both the 8-bit sum term S(E(XY)) and the 8-bit carry term C(E(XY)) are applied to an exponent adder 56b wherein the exponent E(XY) corresponding to the mantissa product M(XY) is formed. The exponent adder 56b which is illustrated in FIG. 12-1 and is illustrated in FIG. 12B and is well known in the art, comprises a full adder 590, two 2-stage ripple-carry adders 591 and one 3-stage ripple-carry adder 592. The full adder 551, the adder 592 and one ripple adder 592a forming part of the two and three stage ripple adders 591, 592 are also shown in FIGS. 10B, 12B, 12C and 12D, respectively.

Figure 15A:
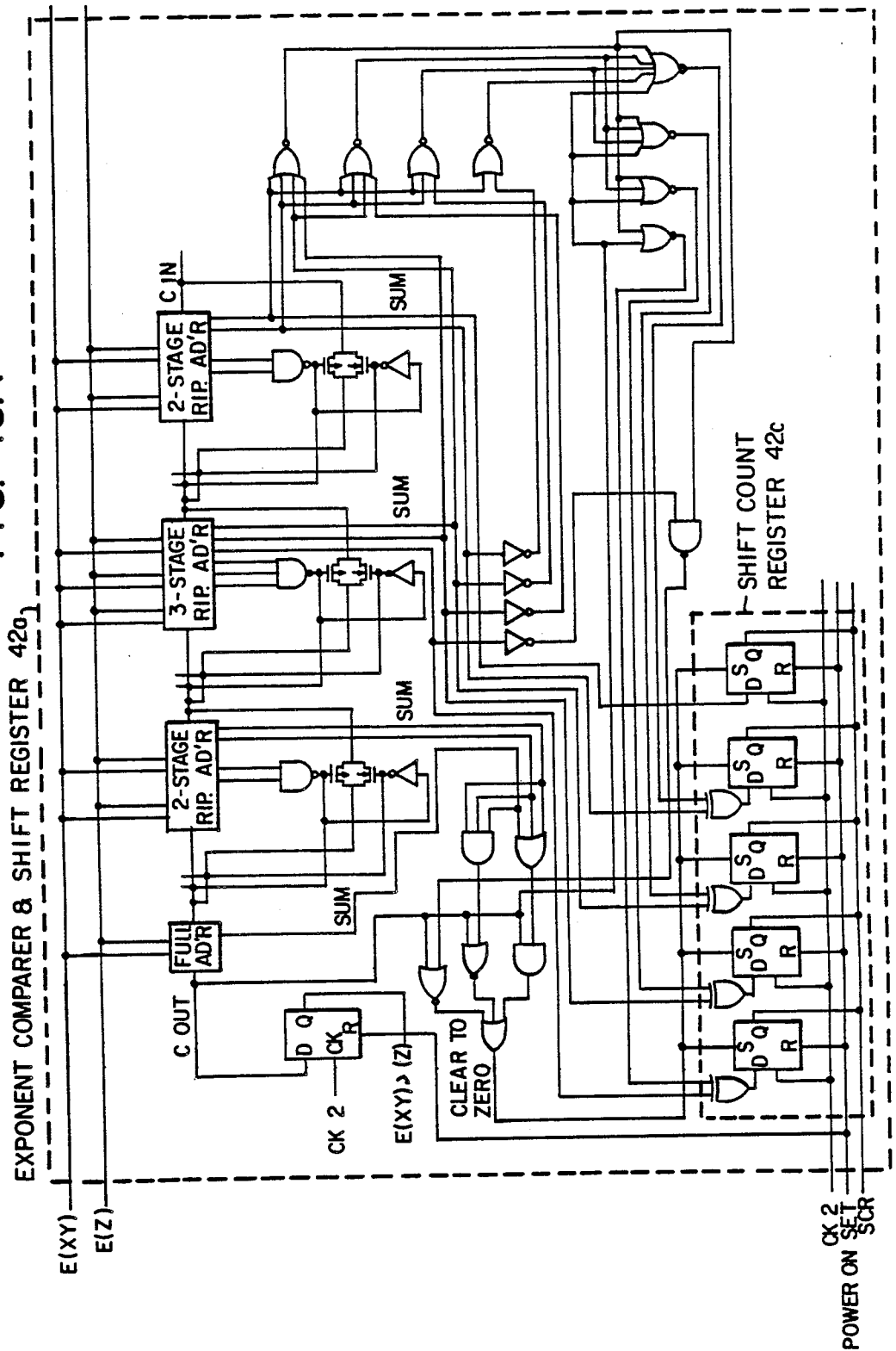
FIG. 15A is a schematic view of an exponent comparer and a shift count register implemented in the devices illustrated in FIGS. 4 and 5.
Figure 15B:
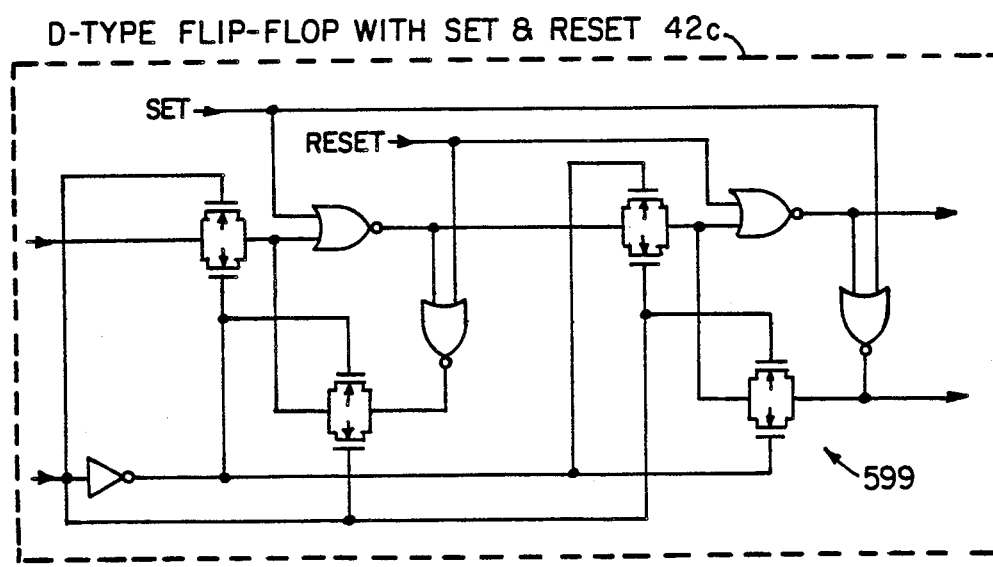
FIG. 15B is a schematic view of a portion of the device illustrated in FIG. 15A.

The output E(XY) from the exponent adder 56b is applied to the status flag generator 60, an exponent comparer 42a and an exponent register 42b as shown in FIG. 4. The exponent comparer 42a is better illustrated in FIG. 15A and has an exponent latch 42e and an exponent accumulation register 42d connected thereto. The register 42d is shown in FIG. 20 and comprises an 8-stage master/slave D-type flip-flop array 612. The comparer 42a receives the mantissa product exponent E(XY) and the accumulation exponent E(Z) and detects the larger of the two exponents. The output from the exponent comparer 42a is conveyed to the exponent register 42b and to a shift count register 42c which is also illustrated in FIG. 15-A wherein the larger exponent and the difference therebetween are stored respectively. One of the flip-flops in the array 599 is better illustrated in FIG. 15B.

The shift count register 42c includes a 5-stage master/slave D type flip-flop array 599 with reset capabilities and applies an output to both the right shifter 40d and the right shift count controller 40i (FIG. 14), thereby informing the mantissa accumulation section 12 which mantissa M(Z) or M(XY) has the larger exponent associated therewith.

Figure 17B:
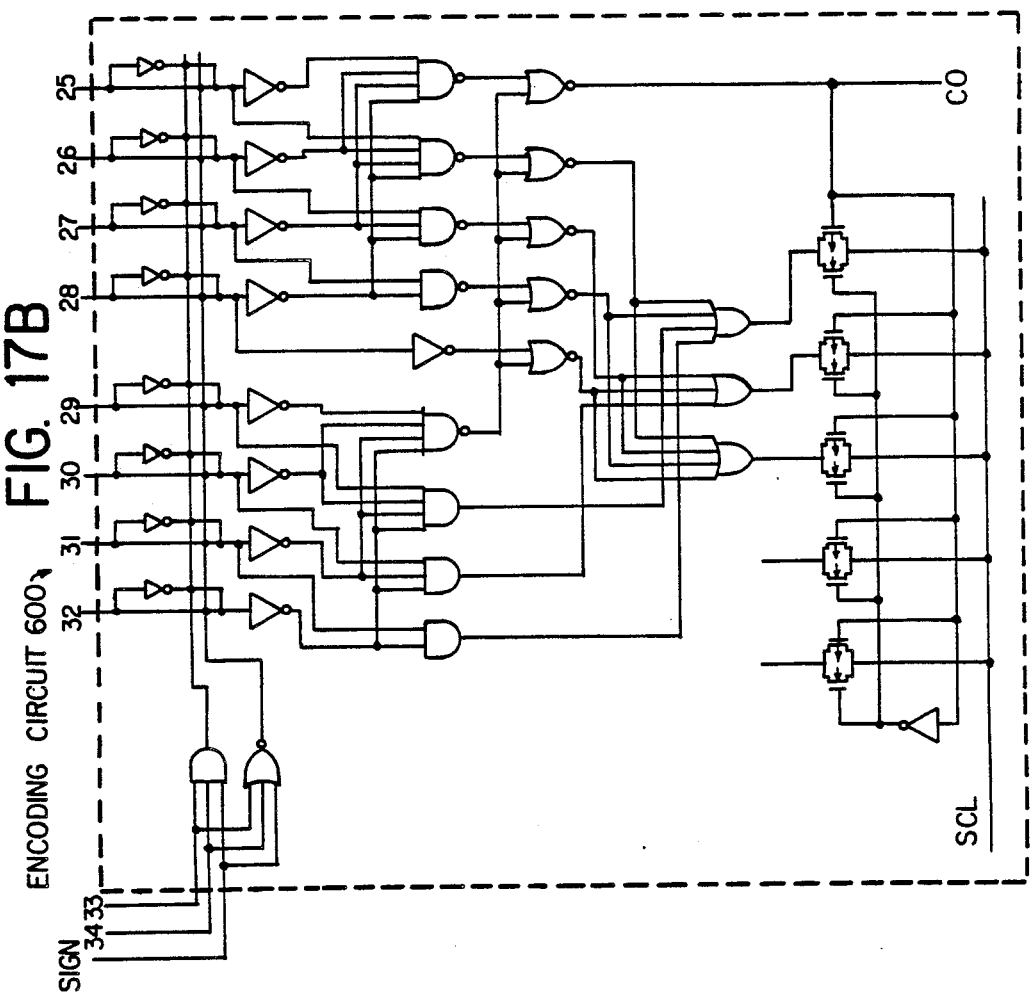
FIG. 17B is a schematic view of a portion of the device illustrated in FIG. 17A.
Figure 17A:
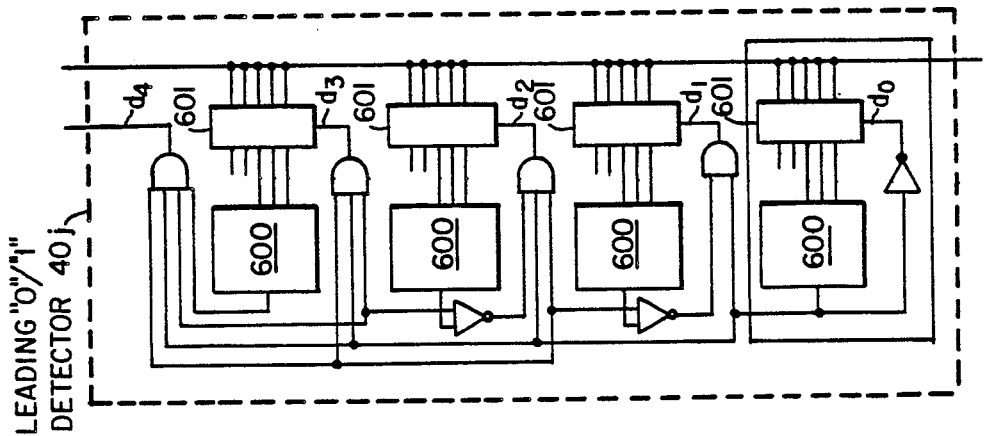
FIG. 17A is a schematic view of a leading zeros and ones detection circuit implemented in the devices illustrated in FIGS. 4 and 5.
Figure 16C:
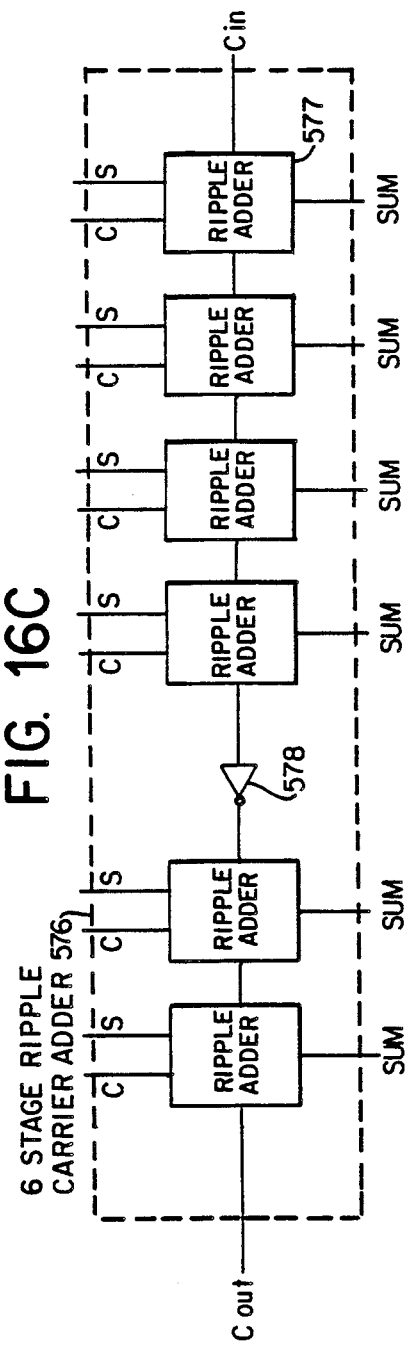
FIG. 16C is a schematic view of a six stage ripple carrier adder.

An overflow and leading zeros and ones detector 40j which is known in the art, receives the 35-bit accumulation mantissa output M(Z)' from the modified carry skip adder 40h and comprises four encoding circuits 600 and four multiplexers 601. The detector 40j is illustrated in FIG. 17A. The output from detector 40j is applied to an exponent adder 42f (FIG. 19) and to the status flag generator 60 to allow the device 30 to detect unnormalized new accumulation mantissa M(Z)' results and to allow exponent E(Z)' associated with the accumulation mantissa M(Z)' to be normalized.

The exponent adder 42f receives the larger of the two exponents from th exponent register 42b and comprises two full adders 602, two 2-stage ripple-carry adders 603 and one 3-stage ripple-carry adder 604. The normalized exponent E(Z)' outputted from exponent adder 42f is conveyed to accumulation exponent register 42d which in turn conveys the accumulation exponent E(Z)' to output line $O_{E(Z)'}$.

Figure 18B:
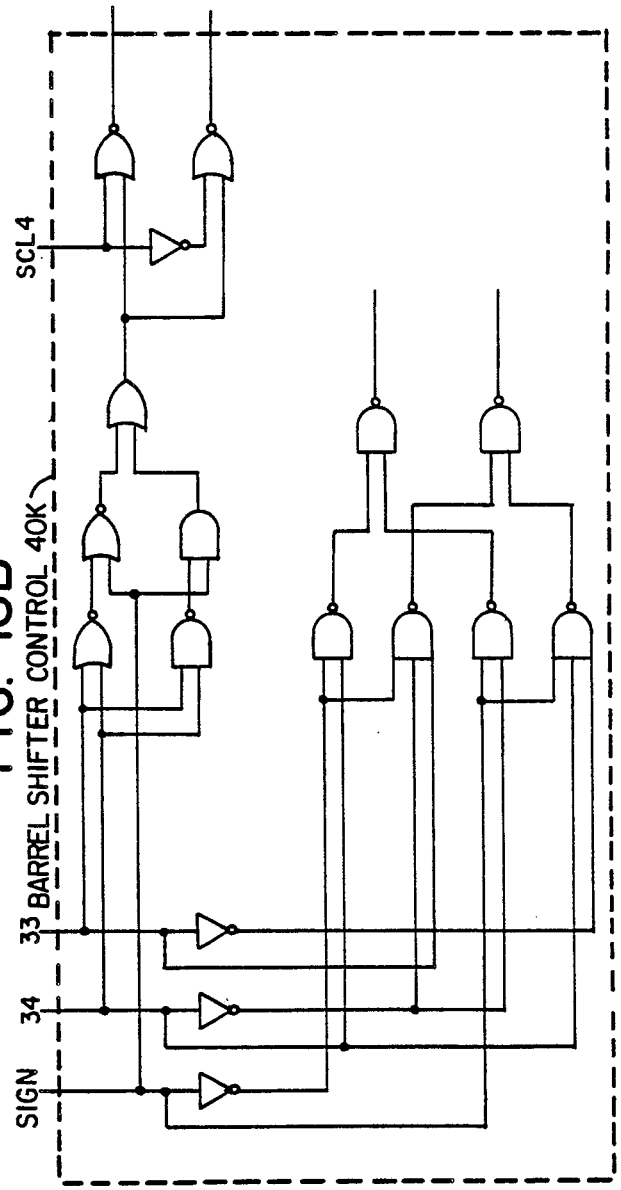
FIG. 18B is a schematic view of a controller for the portion illustrated in FIG. 18A.
Figure 19:
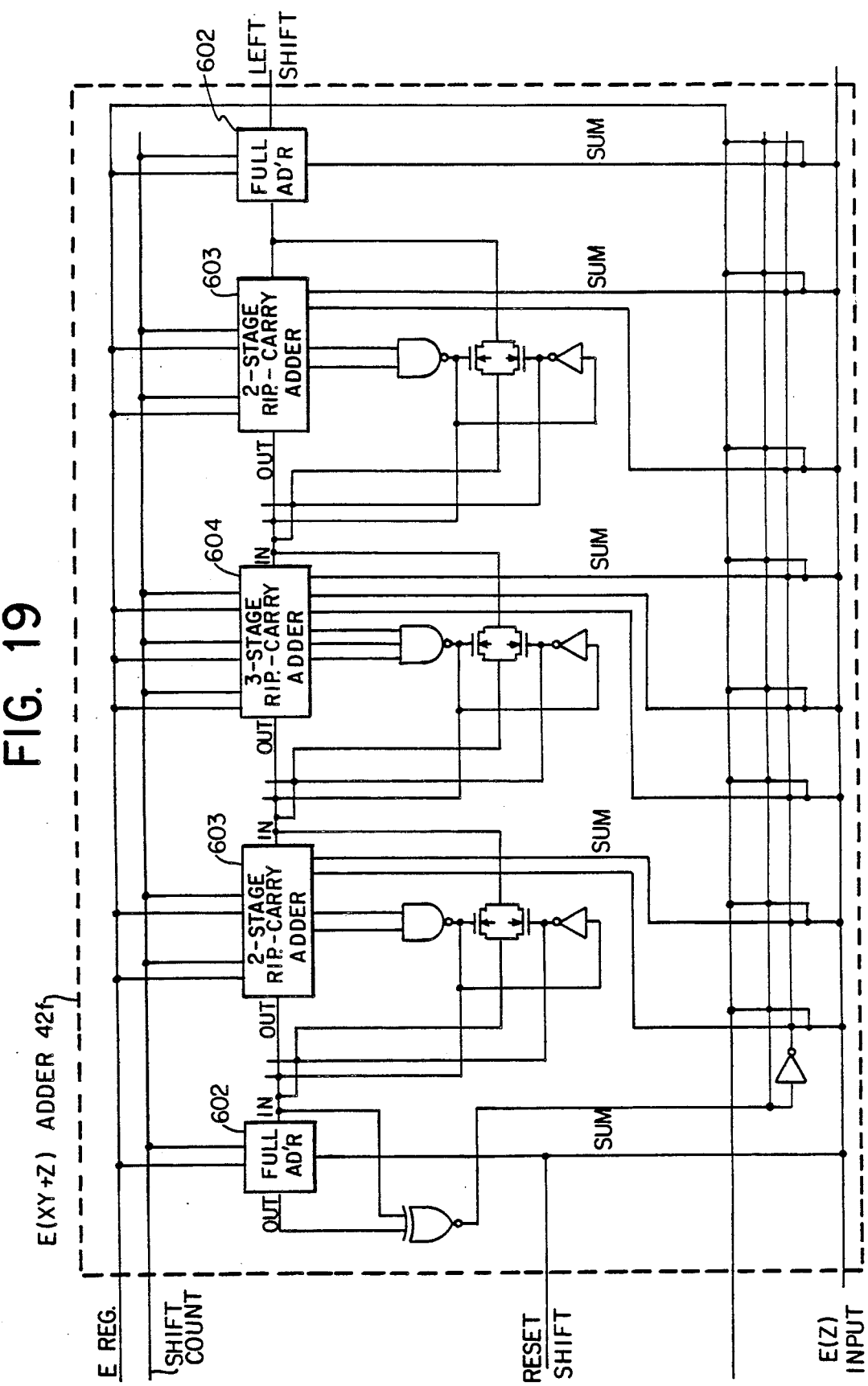
FIG. 19 is a schematic view of an exponent adjustment circuit implemented in the devices illustrated in FIGS. 4 and 5.

The output from the modified carry skip adder (MCSA) 40H is also applied to a barrel shifter 401. As can be seen in FIG. 18A, to obtain a compact layout, the barrel shifter is also partitioned into three stages the first stage of which shifts either 0 or 16 bits at a time to the left or 1 or 2 bits at a time to the right, the second stage of which shifts either 0, 4, 8 or 12 bits at a time to the left and the third stage of which shifts either 0, 1, 2 or 3 bits at a time to the left, thereby forming a 0 to 32-bit left shifter and a 1 to 2-bit right shifter. A barrel shifter control circuit (BSCC) 40k provides control signals to the barrel shifter 401 when normalization of the accumulation result M(Z)' is required. The barrel shift control circuit 40k is illustrated in FIG. 18B. Thus, the control circuit 40k receives normalization signals from the detection circuit 401 when normalization of the accumulation mantissa M(Z)' is required. The control signals are conveyed to the barrel shifter which uses the signals to shift the accumulation mantissa M(Z)' until it is in proper normalized form. Since the barrel shifter performs "power of two" shifts, the barrel controller logic circuit 40k which is known in the art, is easy to implement.

Figure 20A:
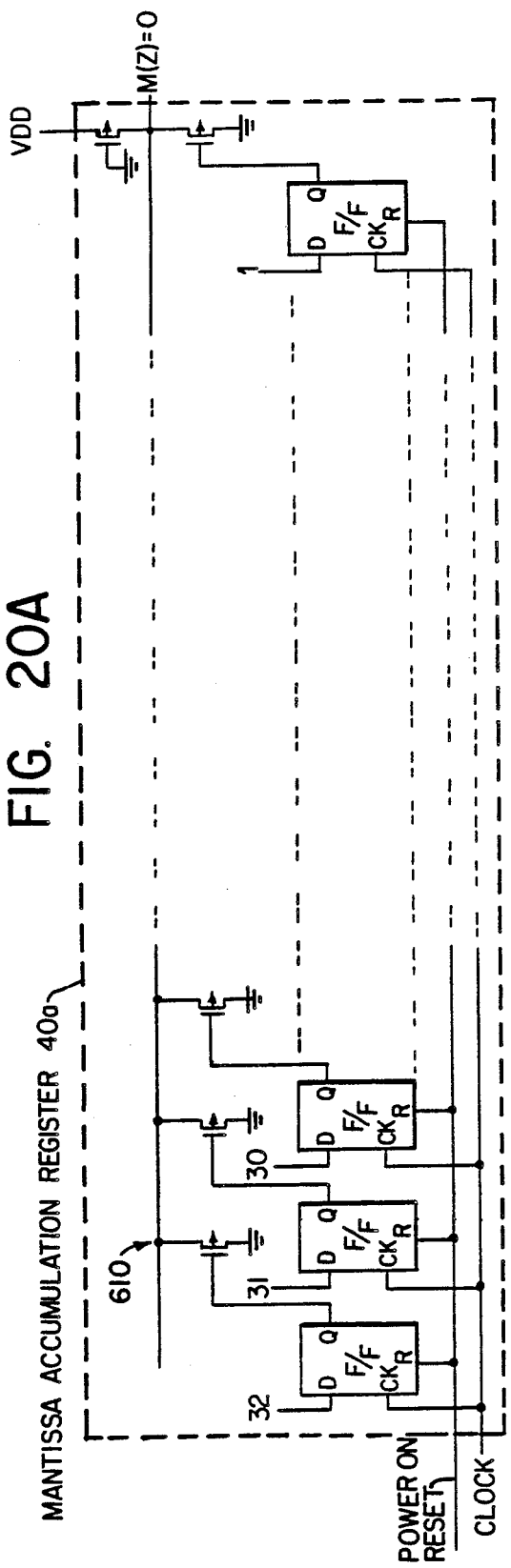
FIGS. 20A and 20B are schematic views of mantissa and exponent registers implemented in the devices illustrated in FIGS. 4 and 5.
Figure 20B:
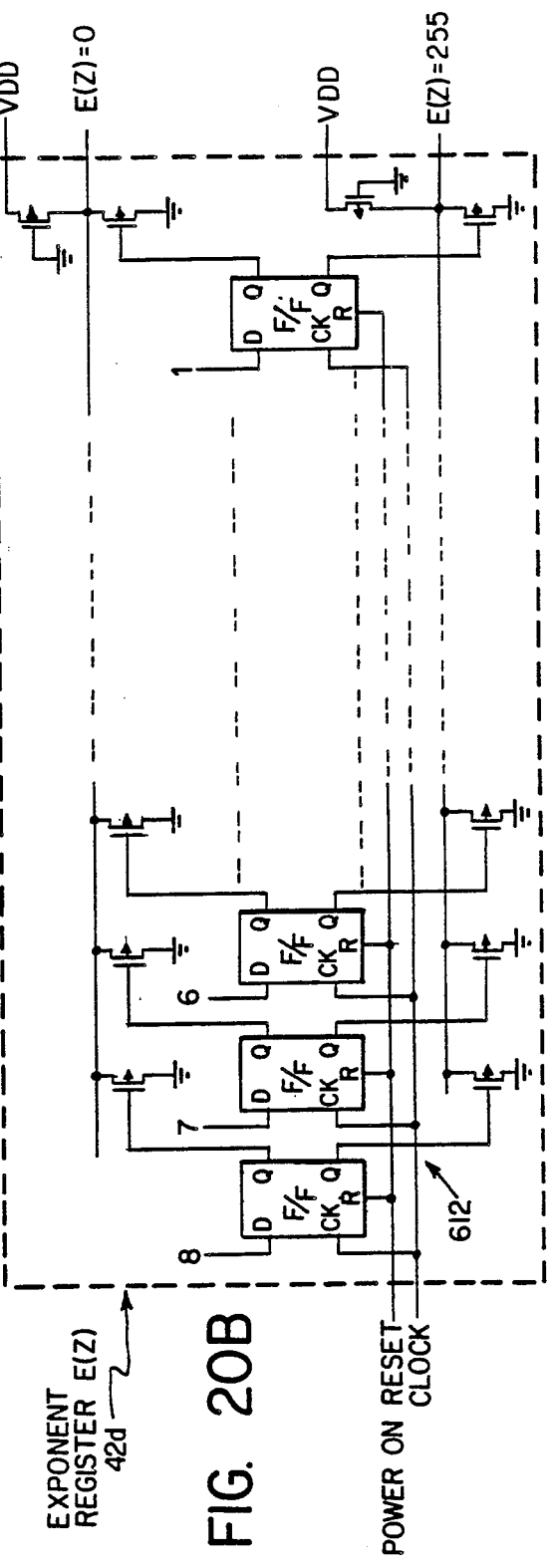

The normalized output M(Z)' from the barrel shifter 401 is applied to the mantissa accumulation register (MAR) 40a which is better illustrated in FIG. 20A. As is shown, the register 40a comprises a 32-stage flip-flop array with reset capabilities formed from D-type master/slave flip-flops 610. The contents of the register 40a are passed through an inverter/non-inverter 62 to a mantissa output line $O_{M(Z)'}$, the inverter/non-inverter of which inverts or passes the result depending on the polarity of the mantissa sign bit.

However, prior to being applied to the output lines $O_{M(Z)'}$ and the $O_{E(Z)'}$, the accumulation mantissa M(Z)' and the accumulation exponent E(Z)' are applied to the format detector 58 which examines the data for incorrect results. If the data is incorrect, the accumulation results are cleared from the accumulation registers 40a and 42d respectively. The inverter non-inverter 62 is controlled by the output from a sign bit latch 64 which receives an input signal from the modified carry skip adder. The input signal contains information concerning 40h the polarity of the mantissa M(Z)' sign bit. The inverter/non-inverter 62 and inverts or passes the normalized mantissa M(Z)' in response to the input signal as required in order to form the correct result. The accumulation results stored in the accumulation registers 40a and 42d respectively are used when forming the a new accumulation result after the receipt of the new input operands X and Y.

A timing generator 70 has clock 72 connected thereto and generates two timing sequences 74 and 76 therefrom, one 76 of which is the inverse of the other. Thus, when timing sequence 74 generates a high signal, timing sequence 76 provides a low signal. The timing sequences 74 and 76 are conveyed to specific components of the device 30 to control the synchronization of the multiply/accumulate operations.

The two phase pipeline processing procedure in accordance with the device 30 during a period of timing sequence 74 is illustrated briefly in FIG. 6a. In this timing diagram, the symbol + represents the accumulation of the received data and the symbol − represents the subtraction relation. The reference numerals in this figure correspond to the elements shown in FIG. 4 which perform the illustrated operations. The detailed description of the two phase pipeline processing is described hereinafter.

The operation of the device 30 will now be described. As the timing sequence 74 goes from a low to high transition, the two input operands X and Y which are applied to the input line IXY, are latched into the respective mantissa registers 44a and 44b, sign registers 52a and 52b and exponent registers 54a and 54b. The format detector 58 which is connected to the mantissa and exponent registers monitors the contents stored in the mantissa and exponent registers and generates appropriate register flags if certain mantissa and corresponding exponent combinations are encountered.

The format detector 58 which comprises AND gate 506 is used to detect when the corresponding exponent and mantissa values E(X) and M(X) or E(Y) and M(Y) are both equal to "0". When this combination of values is detected, the implicit "1" of the mantissa generated by the inverter 501 is reset to ")". AND gate 508 generates an "infinity" register flag when either exponent is equal to "255" and the associated mantissa value is equal to "0". Inverter 509 and AND gate 510 generate a "not a number" register flag when either exponent value is equal to "255" and the associated mantissa value is not equal to "0" Lastly, inverter 509 and AND gate 512 generate a "denormalized number" register flag when either exponent value is equal to "0" and the associated mantissa value is not equal to "0". If one of these combinations is detected, the generated register flag is applied to the status flag generator 60 and appropriate status flags are generated, thereby informing the device 30 that the input binary operands X and Y are unformatted and should not be processed. Furthermore the multiplier and multiplicand mantissa and exponent registers are cleared so that correct input operands can be received.

If the input operands X and Y are valid entries, the 24-bit mantissa of multiplier Y is applied to the modified Booth Encoder 46a which implements a modified Booth's algorithm and thus, examines successive 3-bit groupings $Y_{i+1}$, $Y_i$ and $Y_{i-1}$ of mantissa M(Y). Thus, the multiplier Y which is in the form $(Y_{24}, Y_{23}, Y_{22}, \ldots Y_3, Y_2, Y_1)$, is divided up into the following thirteen 3-bit groupings:

$(Y_2, Y_1, Y_0)$, $(Y_4, Y_3, Y_2)$, $(Y_6, Y_5, Y_4)$ . . .
$Y_{24}, Y_{23}, Y_{22})$ and $(Y_{26}, Y_{25}, Y_{24})$. and each 3-bit grouping is examined.

For each of the 3-bit groupings detected operation signals are generated depending on the binary values of the bits in the grouping. The operation signals inform the carry save adder array 46b which operation is to b performed on the multiplicand X in order to generate the correct partial product. This ensures that the proper mantissa product M(XY) result is formed. Table 2 illustrates the operation performed on the multiplicand X for each of the possible 3-bit groupings $Y_{i+1}$, $Y_i$, and $Y_{i-1}$.

TABLE 2

| 3-Bit Code | | | Operation Signal Generated | | | Operation performed on Multiplicand X to form the correct Partial Product | |
|---|---|---|---|---|---|---|---|
| $Y_{i+1}$ | $Y_i$ | $Y_{i-1}$ | SUB | 1X | 2X | | |
| 0 | 0 | 0 | 0 | 0 | 0 | add 0X | Partial Product comprises all Zeros |
| 0 | 0 | 1 | 0 | 1 | 0 | add 1X | Multiplicand X is the Partial Product |
| 0 | 1 | 0 | 0 | 1 | 0 | add 1X | Multiplicand X is the Partial Product |
| 0 | 1 | 1 | 0 | 0 | 1 | add 2X | Shift multiplicand X one position to the left |
| 1 | 0 | 0 | 1 | 0 | 1 | sub 2X | Shift multiplicand X one position to left and add 1 to LSB thereof |
| 1 | 0 | 1 | 1 | 1 | 0 | sub 1X | Invert multiplicand X and add 1 to LSB thereof |
| 1 | 1 | 0 | 1 | 1 | 0 | sub 1X | Invert multiplicand X and add 1 to LSB thereof |
| 1 | 1 | 1 | 1 | 0 | 0 | sub 0X | Partial Product comprises all Zero |

The 24bit multiplier Y is divided into thirteen 3bit codes and an operation signal is generated for the first twelve 3-bit codes depending on the values of the bits therein. For each of the twelve codes, a partial product is generated the partial products of which are added to form the correct product results. Although the number of partial products is reduced by a factor of two from twenty-four as in conventional multiplication devices to twelve using Booth's algorithm the generation of the plus and minus two's complement of the multiplicand X, the plus and minus one's complement of the multiplicand X and the zeros complement of the multiplicand X are required. It should be noted that the an operation signal is not generated for the thirteenth code since it is associated with bits larger than the required 32-bit multiplier output.

The use of twelve Booth encoders 520 to perform the modified Booth's algorithm on multiplier Y requires the implementation of an array multiplier having twelve rows. The CSA array 46b also has twenty-seven columns, twenty-five columns of which are required, due to number of bits in multiplicand X and two columns of which are used for extended sign information. The carry save adder array 46b receives the output from the mantissa register 44a and the opera-ion signals from the modified Booth encoder 46a. To ensure correct multiplication results the multiplicand X must be in the form of $(0, X_{24} X_{23}, \ldots, x_2, X_1)$ and the multiplier Y must be in the form of $(0, 0, Y_{24}, Y_{23}, \ldots, Y_2, Y_1, 0)$.

Since the mantissa of both the multiplier and the multiplicand are unsigned numbers, the multiplier Y must be padded with two zeros on the left, one so that the multiplier will not be treated as a negative number and the other so that the extreme left Booth-encoded group $Y_{26}$, $Y_{25}$, $Y_{24}$) is complete. The multiplier Y is also padded with one "0" on the right so that the extreme right Booth-encoded group $(Y_2, Y_1, Y_0)$) is complete. Similarly, the multiplicand X is padded with a "0" to the left so that it will be treated as a positive number.

The two additional array columns beyond the most significant bit of the multiplicand X are required to keep track of two's complement extended sign information and two-fold multiplication. A sign-generate scheme is implemented to solve the problem of sign extension. The scheme is described as follows:
1. the sign bit or left-most bit of each partial product is complemented;
2. a "1" is added to the left of the sign bit of each partial product; and
3. a "1" is added to the 26th-bit of the first partial product.

Each row of the CSA array 46b, has a Booth encoder 520 connected thereto and receives an operation signal therefrom. The operation signals are conveyed to the selector/complementor 550 of each array row and the required summands, add or sub 0X, or add or sub 1X, or add or sub 2X as described in Table 2, is generated. The results from the selector/complementors are inputted to the adders of the CSA array 46b so that the proper partial product term for each row can be evaluated.

The binary offset having a value equal to $[4-2^{-(N-1)}]$ or in other words (1111 ... 1110) is generated by the CSA array 46b and is required in order to form a correct minus two's complement result when using the inverter/non-inverter 48 scheme. The generation of the offset is implemented in the following manner:

Firstly, the half adders of the third array row except the left most and the right most are replaced by conditional full adders. Secondly, conditional bits "N", N being an integer value equal to one less than the number of bits in the multiplier Y, are placed to the left of the most significant bit and a bit "/N" is used to replace the most significant bit "1". Thus, an offset equivilent to (1,1,1 ... 1,1,0) having the same number of bits as the multiplier is generated. The offset is added to the part al products generated for each Booth encoder 3-bit grouping. In other words, the add "1" operation in the final partial product is replaced by the add "N bits +/N bit" operation. Thus, the modified Booth encoder 46a and CSA array 46b form a 24-bit parallel mantissa multiplier 46 which performs an unsigned magnitude multiplication. In order to reduce the complex circuitry for rounding, the 16 lower significant bits are directly truncated thereby, generating a 32-bit product comprising a 32-bit product sum term S(XY) and 32-bit product carry term C(XY).

Both the prior art multiplication scheme and the present multiplication scheme are shown in the following examples.

EXAMPLE 3

Let A and B be two signed magnitude binary representations, where A = 1.0110010, and B = 1.1010001
A conventional multiplication scheme yields:

```
      A    1.0110010
    × B    1.1010001
           1.0110010
          1.0110010
         10110010
        10110010
   A*B  1001000101010010
```

If the two's complement thereof is taken, the result is:
01.10111010101110

EXAMPLE 4

The proposed multiplication scheme is illustrated as follows:

```
             0      1.0110010
           × 00     1.1010001    0      (offset)
                   11111111110          (+1) a
                   100010110010
                   101
                   100000000000         (+0) b
                   10
                   100010110010         (+1) c
                   10
                   011101001101         (−1) d
                   10         1
                   100010110010         (+1) e
         S         0000010101110101010000
         C         1111111100100000000000
         S         111110101001010101111
         C         000000001101111111111
        −(S+C)     01.10111010101110
```

Referring to Example 4 the partial products a to e are generated by examining the 3-bit Booth encoded group and performing the corresponding operation on the multiplicand X as described in Table 2. Each partial product is padded with two zeros, two of which ensure that the partial product is the same bit length as the padded multiplier Y and the third of which is for extended sign information. According to the sign generate method, the sign bit or left-most bit of each partial product a to e is complemented. Furthermore a "1" is added to the 11th bit of the first partial product corresponding to step 3 of the sign generate method for an 8-bit by 8-bit example. Lastly, a "1" is added to the left of the sign bit of each partial product thereby completing the partial product and sign extension generation.

With the generation of the partial products complete, the offset and partial products a to d are added to form a temporary product. Following this, the temporary product is added to the last partial product e to form the product sum portion S(XY). The carry bits formed during the addition of the temporary product and the last partial product e are not carried over during the addition but are rather outputted as the carry term C(XY). It should be noted that step 2 of the sign extension method is not performed on the last partial product in this example since the desired output is a 16-bit result and thus, any bits extending to the left of the 16th bit are not required.

The longest propagation path for any partial product generated in CSA array 46b requires passing through seven carry save adders. Thus, the total delay time for the parallel multiplier 46 is equal to the time required to perform the Booth encoding, the time required to select the proper multiplicand complement, and the propagation delay through the seven carry save adders.

The delay characteristics of the adders in CSA array 46b directly effect system performance. Since the carry save adder array 46b is used, both the sum term S(XY) and the product carry terms C(XY) propagation paths must be optimized. An alternating polarity scheme is used in the carry path of the adder to improve the overall delay. The alternating scheme removes one inverter per array row and hence increases speed. Referring to FIG. 10A, two CSA array adders are shown. The first adder operates on a true x and y input and a true Carry input to produce a true sum output and a false Carry output. The adder in the next row operates on true x and true y input and a false carry input to produce a true sum output and a true carry output. The true sum output S(XY) of the CSA array 46 is conveyed to the sum register 46c and stored therein. The contents of sum register 46c and the 32-bit true carry output C(XY) from the CSA array 46b are applied to inverter/non-inverter by way of multiplexor 46d which multiplexes the two signals thereby increasing circuit speed.

Sign generator 50 controls the invert/non-invert operation by generating an invert control signal Cs when both sign bit registers 52a and 52b contain either zeros or ones. Thus, the product sum term and product carry term applied to inverter/non-inverter 48 are inverted or passed unaltered, depending on the sign of both the multiplicand X and the multiplier Y. Using this one's complement technique and by adding the offset constant (1,1,1 ... 1,1,0) to the sum path of CSA array 46b, the speed of the device is increased whilst still providing the desired two's complement sum and carry product result.

Exponent register 54a and 54b hold the 8-bit exponent of the multiplier Y and the multiplicand X respectively. The carry save adder 56a receives the output therefrom as well as an exponent bias constant stored in the exponent bias register 56c. The adder 56a performs an addition between the multiplier and multiplicand exponent values E(Y) and E(X) whilst subtracting therefrom the exponent bias constant The bias constant is equal to "127" and is used in conventional signal processing systems in accordance with IEEE P754 standards. Thus the bias constant must be subtracted from the sum of the exponent values to achieve a correct unbiased exponent sum term E[S(XY)] and exponent carry term E[C(XY)]. The outputs from the CSA adder 56a are conveyed to exponent adder 56b which generates the unbiased exponent E(XY) corresponding to the mantissa product sum term S(XY) and product only term C(XY). The carry bit of the addition between the sum and carry terms is conveyed to status flag generator 60, to allow detection of exponent overflow or underflow.

The method of detecting exponent overflow and underflow using the carry bit is illustrated in the following four examples:

EXAMPLE 5

If E(X)=64 & E(Y)=64 then E(XY)' is equal to 128 as shown.

```
  E(XY) =  64    001000000
+ E(Y) =  64    001000000
  E(XY)' = 128   010000000
```

Now, let the exponent bias constant be represented by E(K). Then the unbiased exponent E(XY) is given as:

```
  E(XY) = 128     010000000
± E(K) = (−127)  110000001
  E(XY) =  1      000000001
```

Thus, the unbiased exponent E(XY) is equal to "1".

EXAMPLE 6

If E(X)=130 & E(Y)=8 then:

```
  E(X) = 130      010000001
+ E(Y) =   8      000001000
  E(XY)' = 138    010001010
```

Again, subtract the bias constant E(K).

```
  E(XY) = 138     010001010
± E(K) = (−127)  110000001
  E(XY) =  11     000001011
```

Thus, the unbiased exponent E(XY)="11".

EXAMPLE 7

If E(X)=192 & E(Y)=192 then:

```
  E(X) = 192      011000000
+ E(Y) = 192      011000000
  E(XY)' = 384    110000000
```

Again, subtract bias constant (K).

```
  E(XY) = 384     110000000
± E(K) = (−127)  110000001
  E(XY) = 257    100000001  ← overflow
```

Thus, the unbiased exponent E(XY)=257".

EXAMPLE 8

If E(X)=63 & E(Y)=63 then:

```
  E(X) =  63      000111111
+ E(Y) =  63      000111111
  E(XY)' = 126    001111110
```

Again, subtract the bias constant E(K).

```
  E(XY) = 126     001111110
± E(K) = (−127)  110000001
  E(XY) =  −1     111111111  ← underflow
```

Thus, the unbiased exponent E(XY)=−"1".

As can be seen from the above examples the most significant t (MSB) of the unbiased exponent sum E(XY) can be used to detect overflow or underflow. If the MSB is equal to zero, the unbiased exponent E(XY) is correct. However, if the MSB is equal to one, overflow or underflow is detected. Thus, the MSB of the unbiased exponent E(XY) is applied to the status flag generator 60 which in turn generates the appropriate exponent status flag, thereby informing the device 30 to inhibit processing of the input operands X and Y.

The exponent result E(XY) of the exponent adder 56b is conveyed to the exponent comparer 42a and to the exponent register 42b. Furthermore, exponent comparer 42a and exponent register 42b receive an input from accumulation exponent register 42d which holds the accumulation exponent E(Z) therein.

Both the unbiased exponent E(XY) and the accumulation exponent E(Z) are compared and the difference [E(XY)−E(Z)] therebetween is stored in the shift count register 42c. Furthermore, the larger of the two exponents E(Z) and E(XY) respectively is stored in exponent register 42b and shall now be referred to as E(Z)'.

To detect the larger of the two exponents, the device 30 generates the difference between the two exponents and uses a bit detection scheme to detect which exponent is larger. The bit detection scheme is illustrated in the following four examples

EXAMPLE 9

If E(XY)=130 & E(Z)=127 then:

```
E(XY) = 130           10000010
+ E(Z) = (−127)        10000001
  [E(XY) − E(Z)] = 3   100000011
```

EXAMPLE 10

If E(XY)=130 & E(Z)=8 then:

```
E(XY) = 130            10000010
+ E(Z) = (−8)          11111000
  [E(XY) − E(Z)] = 122 101111010
```

EXAMPLE 11

If E(XY)=130 & E(Z)=250 then:

```
E(XY) = 130              10000010
+ E(Z) = (−250)          00000110
  [E(XY) − E(Z)] = −120  010001000
```

EXAMPLE 12

If E(XY)=8 & E(Z)=130 then:

```
E(XY) = 8                00001000
+ E(Z) = (−130)          01111110
  [E(XY) − E(Z)] = −122  010000110
```

As can be seen the most significant bit (MSB) of the difference between the unbiased exponent E(XY) and the accumulation exponent E(Z) can be used to detect the larger therebetween. If the unbiased exponent E(XY) is less than the accumulation exponent E(Z), then the MSB or carry-out bit is equal to zero and represents negative results. However, if the unbiased exponent E(XY) is greater than accumulation exponent E(Z) then the MSB is equal to one and represents positive results. If the results thereof are negative, the two's complement of the difference must be taken to obtain a positive value.

For high speed operation, the two's complement of the difference is generated by detecting the least significant non-zero-bit of the difference and inverting all bits to the left thereof. This method of generating the two's complement for the difference is similar to the technique used in the conventional device. However, since the exponent difference is an 8-bit result, the implementation of this method does not increase the processing speed of the device 30. If the difference is greater or equal to thirty-two or less than or equal to minus thirty-two, i.e., [E(XY)−E(Z)]<32 or [E(XY)−E(Z)<32], the shift count in the shift count register is set to equal thirty-one and the sign bit or MSB of the corresponding mantissa is reset. In other words, the mantissa must be cleared to zero in order to avoid errors in shifting.

The multiplexers 40b and 40c receive the product carry C(XY) term, the product sum S(XY) term from inverter/non-inverter 48 and the accumulation mantissa M(Z) from mantissa accumulation register 40a, and allow the received data to be transmitted via common conductors If the exponents E(Z) and E(XY) are not of the same magnitude (i.e. the difference [E(XY)-E(Z)=0], then the accumulation mantissa M(Z) and the product sum S(XY) and product carry C(XY) cannot be added immediately to form a new accumulation mantissa M(Z)'. If a difference in the magnitude of the exponents is detected, the mantissa with the smaller corresponding exponent is right-shifted by the difference stored in the shift count register. This in effect increments the smaller exponent until it has the same magnitude as the larger exponent. When the mantissa has been right-shifted by the correct amount, the accumulation mantissa M(Z) and the product sum and product carry terms S(XY) and C(XY) respectively are added to form the resultant new accumulation mantissa M(Z)'.

To facilitate this process, the following circuitry is provided The shift count register 42c applies the difference [E(XY)-E(Z)] to the right shift controller 40i and applies a selection signal to right shifter 40d. These signals ensure that the correct mantissa is right-shifted by the proper amount. If the product carry C(XY) and product sum S(XY) terms have the smaller corresponding exponent, then the product carry term C(XY) is right-shifted when the timing sequence 74 provides a high signal and the product sum term S(XY) is right-shifted when the timing sequence 74 provides a low signal. Otherwise, the accumulation mantissa M(Z) is right-shifted when the timing sequence 74 provides a low signal.

Multiplexer 40c has the exponent register 42b, multiplexer 40b and right shifter 40d connected thereto and receives the carry output therefrom. As is well known in the art, the multiplexers are implemented to increase the operational speed of the device and will not be described in detail. The output from the multiplexer 40c is applied to the carry register 40f via a single conductor. The carry register 40f stores and conveys the 32-bit product carry C(XY) term to the carry save adder 40g. The CSA 40g also receives an input from multiplexer 40b and right shifter 40d and performs an addition between the accumulation mantissa M(Z) and the mantissa product sum S(XY) and product carry C(XY) terms thereby forming new accumulation mantissa sum S(XY+Z) and accumulation carry C(XY+Z) terms.

The sum S(XY+Z) and carry C(XY+Z) terms are conveyed to the modified carry skip adder 40h wherein a final addition is performed to form a new 35-bit binary mantissa accumulation value M(Z)', the 35th-bit of which is a sign bit. This result represents the final summation result of the mantissa accumulation contents M(Z) and the mantissa product M(XY).

The overall speed of the mantissa accumulator 40 is determined by the rate of the carry propagation. To obtain high speed addition of the partial products M(Z), C(XY) and S(XY) respectively, a simple Manchester carry chain can be used although a large delay results due to the fact that for a N-bit accumulator, the carry must propagate through N-stages. Thus to overcome these delays, the present device implements a modified carry skip scheme combined with a Manchester carry chain and a carry select method to shorten the path of the carry propagation and still maintain simplicity.

A 34-bit adder which implements the carry skip scheme includes eight 4-bit adders and one 2-bit adder. For each 4-bit adder, the carry term still propagates through the Manchester carry chain internally. The only difference is that a multiplexer is inserted to bypass the carry-in of each 4-bit adder directly to the carry-out thereof. The critical path for the carry-out generated by each 4-bit adder propagates through 3-bit cells and one carry skip multiplexer. By inserting the carry skip multiplexers, each 4-bit adder may generate its local carry-out bits concurrently. Thus, the total delay for the carry-out of the 34-bit carry skip adder is reduced to 13 gate delays.

The 13 gate delays can be derived by summing the critical path of the first adder which has three gate delays, the number of skip multiplexers through which the carry propagates resulting in 8 gate delays, and the number of bit cells in the last adder resulting in 2 gate delays. By examining the delay of the most significant resultant bit of each adder, it can be seen that the delay is dominated by the number of carry skip multiplexers and the number of bit cells in front thereof.

Figure 16B:
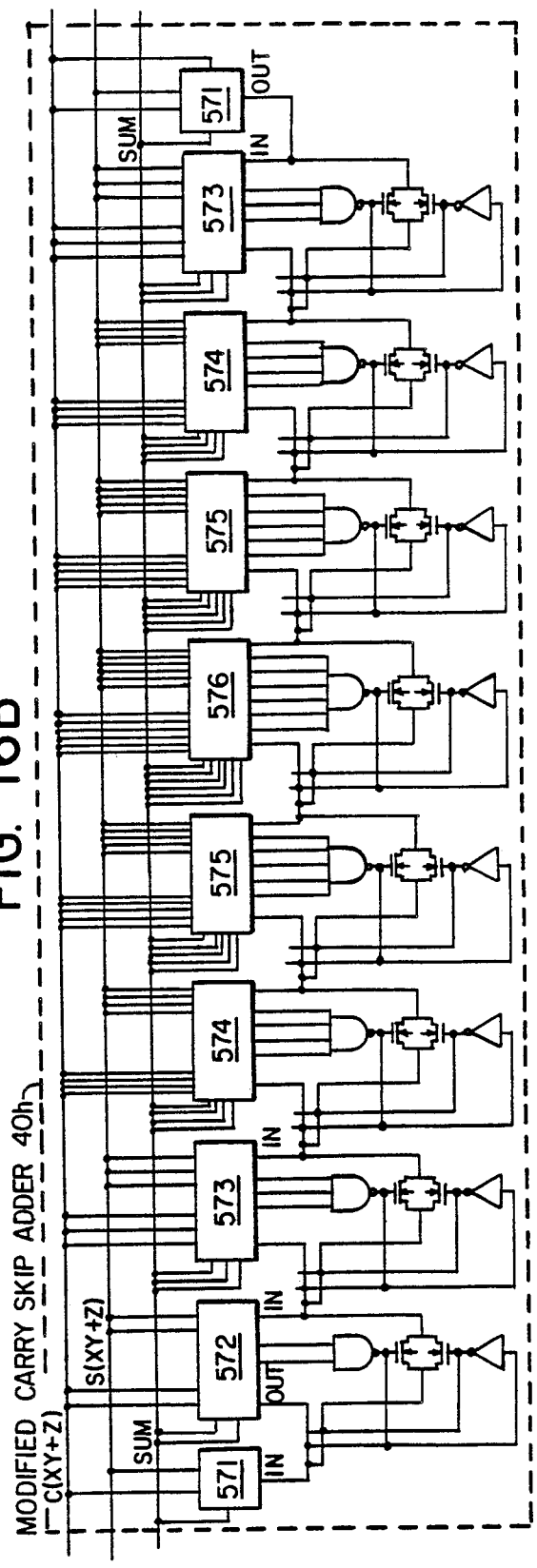
FIG. 16B is a schematic view of a modified carry skin adder illustrated in FIGS. 4 and 5.

By varying properly the number of bit cells of each adder stepwise, the resultant bits can be generated simultaneously thereby reducing the delay time for each resultant bit. The present device implements the 34-bit modified carry skip adder 40$h$ which is illustrated in FIG. 16B and includes ten adders in total. The ten adders varying the numbers of bits stepwise comprise two 1-bit adders 571, one 2-bit adder 572, two 3-bit adders 573, two 4-bit adders 574, two 5-bit adders 575, and one 6-bit adder 576. According to this implementation, the total delay time of this 34-bit adder is ten gate delays.

The final process required prior to the storage and output of the new accumulation mantissa M(Z)' and corresponding exponent E(Z)' into accumulation registers 40$a$ and 42$d$ respectively is to examine whether the new accumulation mantissa M(Z)' is normalized. To facilitate this, the output from the modified carry skip adder 40$h$ is fed to a post normalizer comprising the overflow and leading zeros and ones detector 40$j$, the shift control logic circuit 40$k$ and the barrel shifter 40$l$. The post normalizer examines mantissa M(Z)' and performs the correct normalizing procedure required, examples of which are set out to show the process in more detail.

The exponent value E(Z)' stored in exponent register 42$b$ is applied to the exponent adder 40$f$. The adder 40$f$ also receives an input from the zeros and ones detector 40$j$ and adjusts the exponent value in accordance with the necessary mantissa normalization procedures. The four post-normalization cases are described in the following examples:

EXAMPLE 14

If the unnormalized binary mantissa M(Z)' has the sign or 35th-bit equal to zero and bit 34 or bit 33 or bit 32 equal to zero, then the mantissa M(Z)' is detected as a positive number. In this case, the detector 40$j$ detects the number of consecutive leading zeros in M(Z)' starting from the 32nd-bit. Folowing this, the detector 40$j$ conveys the number of leading zeros to the control circuit 40$j$ which in turn causes the barrel shifter 40$l$ to left shift the mantissa M(Z)' by this number. In other words, the 32nd-bit position. The detector 40$j$ also sends this number to the exponent adder 42$f$ where it is subtracted from the accumulation exponent E(Z)' thereby adjusting the exponent so that the accumulation mantissa and the accumulation exponent values coincide.

|       | sign bit | 34 | 33 | 32 | binary point | 31 | 30 | 29 | 28 | 27 | 26 | 25 | 24 | ... | exponent |
|-------|----------|----|----|----|--------------|----|----|----|----|----|----|----|----|-----|----------|
| M(Z)' | 0        | 0  | 0  | 0  | .            | 0  | 0  | 0  | 1  | 0  | 1  | 0  | 0  | --  | 5 E(Z)'  |
| renormalization (left shift four bits) ||||||||||||||||
| M(Z)' | 0        |    |    | 1  | .            | 0  | 1  | 0  | 0  | -  | -  | -  | -  |     | 1 E(Z)'  |

After performing this, the normalized mantissa M(Z)' and exponent E(Z)' are conveyed to and stored in accumulation registers 40$a$ and 42$d$ respectively.

EXAMPLE 15

If the mantissa M(Z)' has the sign bit equal to zero and bit 34 or bit 33 not equal to zero then overflow is detected To normalize the result zeros detector 40$j$ detects whether the one is found the 34th or 33rd-bit position and applies a control signal to the shift control circuit 40$k$ which in turn causes the barrel shifter 40$l$ to right shift the mantissa M(Z)' until a one is located in the 32nd-bit position. Accordingly the detector 40$j$ sends signal to exponent adder 42$f$ and the exponent E(Z)' is incremented by the number of right shifts accordingly For example:

|       | sign bit | 34 | 33 | 32 | binary point | 31 | 30 | 29 | 28 | 27 | 26 | 25 | 24 | ... | exponent |
|-------|----------|----|----|----|--------------|----|----|----|----|----|----|----|----|-----|----------|
| M(Z)' | 0        | 1  | 0  | 1  | .            | 0  | 0  | 0  | 1  | 0  | 1  | 0  | 0  | --  | 5 E(Z)'  |
| renormalization (right shift two bits) ||||||||||||||||
| M(Z)' | 0        |    |    | 1  | .            | 0  | 1  | 0  | 0  | 0  | 1  | 0  | 1  |     | 7 E(Z)'  |

EXAMPLE 16

If the mantissa M(Z)' has a sign bit or 35th-bit equal to one and bit-34 and bit-33 are not equal to one, then underflow is detected. The leading ones and zeros detector 40$j$ detects which bit of either the 34th or the 33rd contains the zero and sends the result to the control circuit 40$k$ and the exponent adder 42$f$. The barrel shifter 40$l$ right shifts M(Z)' until the zero is in the 32nd position and exponent E(Z)' is incremented accordingly. For example:

|       | sign bit | 34 | 33 | 32 | binary point | 31 | 30 | 29 | 28 | 27 | 26 | 25 | 24 | ... | exponent |
|-------|----------|----|----|----|--------------|----|----|----|----|----|----|----|----|-----|----------|
| M(Z)' | 1        | 1  | 0  | 1  | .            | 0  | 0  | 0  | 1  | 0  | 1  | 0  | 0  | --  | 5 E(Z)'  |
| renormalization (right shift one bit) ||||||||||||||||
| M(Z)' | 1        |    |    | 0  | .            | 1  | 0  | 0  | 0  | 1  | 0  | 1  | 0  |     | 6 E(Z)'  |

EXAMPLE 17

If the mantissa M(Z)' has a sign bit equal to one and bit-34 and bit-33 and bit-32 are equal to one, then the detector 40$j$ examines the mantissa M(Z)' and determines the number of consecutive leading ones starting from 32nd bit therein. The exponent adder 42$f$ receives this number therefrom and subtracts it from the exponent $E(Z)'$ to form a normalized result. Furthermore, the shift control circuit 40k receives the number and causes the barrel shifter 40l to left shift the mantissa $M(Z)'$ by this number. In other words, the mantissa $M(Z)'$ is left-shifted until a zero is located in the 32nd-bit position For example:

|        | sign bit | 34 | 33 | 32 | binary point | 31 | 30 | 29 | 28 | 27 | 26 | 25 | 24 | ... | exponent |
|--------|----------|----|----|----|--------------|----|----|----|----|----|----|----|----|-----|----------|
| $M(Z)'$ | 1 | 1 | 1 | 1 | . | 1 | 1 | 0 | 1 | 0 | 1 | 0 | 0 | -- | 5 $E(Z)'$ |
|        |          |    |    |    | renormalization (right shift two bits) |    |    |    |    |    |    |    |    |     |          |
| $M(Z)'$ | 1 |  |  | 0 | . | 1 | 0 | 1 | 0 | 0 | - | - | - | - | 2 $E(Z)'$ |

To detect the number of leading zeros and ones in the mantissa $M(Z)'$, the leading zeros and ones detection circuit 40j uses the following scheme:

If W is an N-bit binary word and of the form $(W_{n-1}, W_{n-2}, \ldots, W_1, W_0)$ then let Q equal the number of leading zeros and V equal the number of leading ones in W.

EXAMPLE 18

Thus,
if W=(0 0 0 0 0 0 1 0 1 1 1 1 0 0 0 0 1)
then Q=6 and V=0;
and
if W=(1 1 1 1 1 0 0 1 0 1 0 1 0 0 0 1 0)
then V=5 and Q=0.

The number of zeros or ones in the binary word W can be detected through either single or multiple level encoding. Single-level encoding is faster but the fan-in restrictions of the logic gates, make it impractical to implement.

Alternatively, the binary word W can be broken into a large number of lesser bit sub-words and leading zeros and ones detection can be performed on each subword in parallel. If an 8-bit subword can be examined for zeros and ones using single-level encoding for each subword without violating the fan-in restrictions, then a 32-bit word can be broken into four 8-bit subwords, without resulting in a large delay time.

Thus, for an N-bit binary word W the following scheme is used. The binary word W is broken up into sub groups $(W_0, \ldots, W_i, \ldots, W_{m-1})$ where $W_i$ is a subword of W, m is the number of subwords and p is the number of bits in each subword with the constraint $0 \leq i \leq m-1$.

For the purpose of illustration, let W equal the following 21-bit binary word:
W=(0 0 0 0 0 0 0 1 0 1 1 1 1 0 0 1 1 0 1 0)

If the subword size p is equal to seven, then the number of subwords m in W will be three with the constraint $0 > i \leq 2$
Thus,
$W_0$=(0 0 0 0 0 0 0);
$W_1$=(0 1 0 1 1 1 1); and
$W_2$=(0 0 1 1 0 1 0).

Also, let $q_i$ be the number of leading zeros in $W_i$ and thus, $q_0$ is equal to 7, $q_1$ is equal to 1 and $q_2$ is equal to 2. Therefore, the number of leading zeros Q in W can be evaluated as:

i=m-1
Q=ϵ
$r_i * q_i$
i=0 with the following constraint that if $q_0, q_1, \ldots, q_{i-1}=p$ and $q_i<p$, then $r_j=1$ and $r_k=0$ for all $j \leq i$ and $k>i$. For example: if $q_0=q_1=p$ and $q_2<P$, then $Q=2_p+q_2$.

The algorithm ensures that all leading zeros in one level can be detected provided that the summation thereof can be determined immediately following the parallel detection of all the subwords. To achieve this a carry precoding method and a tri-state configuration are implemented.

When using a leading ones and zeros detection circuit on m number of p-bit subwords, (m+1) parallel subword detection circuits $(D_0 \ldots, D_i, \ldots D_m)$ are required. The carry precoding method requires that the carry of $(i*p)$ leading zeros will be generated internally in the $(D_i+1)$ subword detector.

Referring to FIG. 17A, the leading zeros and ones detector circuit shows an encoding circuit 600 which examines an 8-bit binary subword, $W_i$, and generates four outputs, three of which represent the number of leading zeros $q_i$ in $W_i$ and the fourth of which is a control output which indicates if eight leading zeros are detected in $W_i$. Each encoding circuit 600 is connected to set of 5 tri-state drivers (transmission gates) to form subword detection circuit $D_i$. Four subword detection circuits are required for a 32-bit leading-zero and ones detection circuit. Each set of tri-state drivers is precoded in correspondence to its subword ordering For example the two higher-order tri-state drivers in $D_i$ are precoded as 01 to give a carry of 8 leading zeros from $D_0$. Each set of tri-state drivers is enabled/disabled according to the logic of the control line $d_i$. When the tri-state drivers are enabled, the outputs give the number of leading zeros Q in the binary word W.

i=m-1
Q=ϵ
$d_i[(i*p)+q_i]$
i=0

It should be noted that only one control line $d_i$ can have a logic value equal to 1. Also if the count of leading zeros/ones in binary word W is equal to 32 ($d_4$=1) a shift count signal is applied to the shift count register 42c wherein the count is to equal 31 and the least significant bit is reset, thereby clearing the accumulation registers.

After the normalization process is complete the 32-bit mantissa $M(Z)'$ is conveyed to the mantissa accumulation 40a. Similarly, the adjusted 8-bit resultant exponent $E(Z)'$ is conveyed from the exponent adder 42f to the exponent accumulation register 42d. The contents of the registers 40a and 42d are outputted via output lines $O_{M(Z)'}$ and $O_{E(Z)'}$ respectively. A sign bit latch 64 detects whether the accumulation mantissa $M(Z)'$ entering the post-normalizer was a positive or a negative result and generates a control signal for inverter/non-inverter 62. If the resultant accumulation mantissa $M(Z)'$ is negative, a control signal is generated such that the result is inverted prior to being outputted. Conversely, if the resultant accumulation mantissa $M(Z)'$ is positive, it will pass through inverter/non-inverter 62 unaltered.

Furthermore, prior to outputting the accumulation mantissa M(Z)' and exponent E(Z)', the two values are applied to the format detector 58 to detect unformatted combinations. If one of these combinations occurs, the accumulation registers are cleared and the output data is ignored.

The sum register 46c, exponent register 42b and carry register 40f are also connected to a test line 78. The test line 78 allows test patterns to be entered into the three registers 46c, 42b and 40f respectively so that the output thereof may be observed. Thus, the data therein can be scanned during the intermediate stages of the multiply/accumulate operations.

The accumulation mantissa register 40a, exponent accumulation register 42d and shift count register 42c are also connected to a power line 80. When line 80 is energized the three registers 40a, 42d and 42c are reset, thereby clearing their contents to zero. Thus, the contents stored therein may be cleared at any desired time.

By generating the binary offset value during formation of the partial products in the multiplication stage, the present device 30 eliminates the need for a complex two's complement circuit. Furthermore, by propagating the product sum and product carry terms to the accumulation stage, the carry look ahead adder of the conventional device has been removed. Thus, the present device increases the operation speed by reducing the amount complex circuitry required.

Referring now to FIGS. 5 to 20A and 20B, another embodiment of the multiplication and accumulation device is shown in more detail. For the sake of clarity, components of the second embodiment that are found in the first embodiment are indicated with like reference numerals. Similar to the device 30 in the first embodiment, the device 230 comprises mantissa registers 44a and 44b, sign registers 52a and 52b and exponent registers 54a and 54b respectively having an input line, $I_{xy}$ connected thereto. The contents of mantissa registers 44a and 44b and exponent registers 54a and 54b are fed to format detector 58 which monitors the contents stored therein and generates a corresponding register signal that is conveyed to the status flag generator 60.

The contents of exponent registers 54a and 54b are fed to the carry save adder 56a which also receives an exponent bias constant from exponent bias register 56c. Carry save adder 56a adds the contents of exponent registers 54a and 54b and subtracts therefrom the exponent bias constant thereby forming an unbiased exponent sum term E(S(XY)) and exponent binary term E(C(XY)). The sum and carry terms therefrom are applied to exponent adder 56b wherein a single exponent product E(XY) is formed. Adder 56b also supplies an overflow and underflow signal to status generator 60 in order that appropriate status flags are generated. The output exponent product E(XY) is applied to an exponent comparer 42a and to an exponent register 42b. Exponent comparer 42a also receives the contents E(Z) stored in exponent accumulation register 42d, and compares the two exponents. The larger of the two exponents is stored in exponent register 42b and the difference [E(XY)-E(Z)] therebetween is conveyed to a shift count register 42c. Thus, it will be appreciated that the exponent process of this embodiment is the same as that of the first embodiment.

As the timing sequence 274 goes from a low to high transition the mantissa, sign and exponents of the two input operands X and Y are latched into the appropriate input registers. The contents of mantissa register 44b are fed to a modified Booth encoder 46a. The contents from modified Booth encoder 46a and mantissa register 44a are then fed to carry save adder array 46b. Carry save adder array 46b generates an offset value and the corresponding partial products as determined by the Booth encoder operation signals and performs a high speed addition between the offset and partial products to form product sum S(XY) and product carry C(XY) terms in the same manner as in the first embodiment. Both the sum and the carry output from CSA array 46b are fed to inverter/non-inverter 48. Sign generator 50 which receives input from sign registers 52a and 52b respectively generates the control signal for inverter/non-inverter 48.

The carry output C(XY) from inverter/non-inverter 48 is applied to a right shifter 240 m and the sum output S(XY) from inverter/non-inverter 48 is conveyed to multiplexers 40b and 40c. Multiplexers 40b and 40c also receive input from a mantissa accumulation register 40a and the exponent register 42b. The output from multiplexer 40c is fed to right shifter 40d and the output therefrom is applied to the carry save adder 40g. The carry save adder 40g also receives the output from multiplexer 40b and right shifter 240 m. Carry save adder 40g performs an addition between the inputs and forms an accumulation sum S(XY+Z) and an accumulation carry C(XY+Z) result. The sum S(XY+Z) and carry C(XY+Z) terms conveyed to a sum register 46c and carry register 20f respectively and stored therein.

The output from registers 46c and 40f are applied to modified carry skip adder 40h wherein the results are combined to form a new accumulation mantissa M(Z)'. The mantissa M(Z)' is fed to overflow and leading zeros and ones detector 40j and barrel shifter 40l wherein the result is normalized in the manner described in the first embodiment. After normalization of the mantissa M(Z)' and the exponent E(Z)', the results are stored in accumulation register 40a and 42d.

The contents of the accumulation exponent register 42d are then outputted via output line $O_{E(Z)}$, and the contents of mantissa accumulation register 40a are outputted via output line $O_{M(Z)}$. Sign bit latch 64 detects the polarity of the mantissa accumulation result M(Z)' and generates an invert/non-invert signal to inverter/non-inverter 62 accordingly. Thus, the mantissa accumulation result M(Z)' is inverted or passed unaltered in order to obtain a proper two's complement output.

Similarly, the accumulation mantissa M(Z)' and exponent E(Z)' are conveyed to the format detector 58 to detect improper format.

As can be seen, the device 230 eliminates the need for multiplexer 46d and multiplexer 40e found in the device 30, but requires an additional right shifter 240 m. After the one's complement of the product sum and product carry results from CSA adder 46b have been taken using inverter/non-inverter 48, mantissa aligning of both the carry C(XY) and the sum S(XY) outputs or the accumulation mantissa M(Z) whichever is required, is performed when timing sequence 274 is high. Thus, all right shifting can be performed at the same time without delay.

A timing diagram for the devise 230 is illustrated in FIG. 6b. As should be apparent, the device 230 reduces the operation time required for the right shifting that is necessary in the device 30 and therefore further increases the speed of the integrated circuit. However, additional circuitry for the second right shifter 240 m is required.

Thus, the present devices 30 and 230 increase the processing speed of multiply/accumulate operations by reducing the requirement for complex circuitry. Although, the present devices are described using 8-bit and 24-bit binary examples, the device can be modified to perform these operations on a variety of bit lengths and can be used in fixed point notation as well as floating point notation.

Furthermore, it should be apparent to one skilled in the art that, the present device can be implemented in a number of applications wherever high speed multiplication and accumulation operations are required.

We claim:

1. A multiplication device for forming in two's complement form the product of first and second N-bit input binary numbers, comprising:
   a numerical binary offset generation means examining the bit length of one of said first and second input numbers and generating a numerical binary offset of the value $X=(4-2^{-(N-1)})$ wherein N is a positive integer and corresponds to the bit length of said first and second input numbers;
   a partial product generating means receiving said first and second input binary numbers and generating therefrom, first and second sets of partial products;
   a first addition means adding said binary offset and said first and second sets of partial products to form a product sum portion and a product carry portion; and
   a second addition means adding said product sum portion and said product carry portion to form a resultant two's complement product.

2. A multiplication device as defined in claim 1 wherein said partial product generating means comprises an encoding means for encoding said first binary number into a plurality of codes and generating for each of said codes an operation signal, said operation signals determining said first set of partial products, said partial product generating means generating a first partial product for each of said operation signals to form said first set of partial products.

3. A multiplication device as defined in claim 2 wherein said partial product generating means further comprises sign extension means, said sign extension means examining each of said first partial products and generating for each of said first partial products a second partial product to form said second set of partial products.

4. A multiplication device as defined in claim 3 wherein said offset generation means, said sign extension means and said first addition means form acarry save adder array, and said encoding means is a modified Booth encoder.

5. A multiplication device for forming in two's complement form the product of first and second N-bit input binary numbers, comprising:
   first and second storage means receiving and storing therein said first and second input binary numbers respectively;
   a Booth encoder in communication with said first storage means for receiving said first input number, said encoder encoding said first input number into a plurality of codes and generating for each of said codes an operation signal;
   a carry save adder array in communication with said second storage means, said adder array receiving said operation signals and said second binary number and forming therefrom a product sum portion and a product carry portion;
   a first adder adding said product sum and carry portions to form a resultant two's complement product, said carry save adder array comprising:
   a numerical binary offset generation means examining said second binary number and generating an offset value determined by the value $X=(4-2^{-(N-1)})$; wherein N is a positive integer corresponding to the bit length of said first and second input binary numbers;
   a partial product generating means receiving said operation signals and generating for each of said operation signals a first partial product to form a first set of partial products;
   a sign extension means examining each of said first partial products and generating for each of said first partial products a second partial product to form a second set of partial products; and
   a first addition means adding said first set of partial products, said second set of partial products and said offset to form said product sum portion and said product carry portion.

6. A multiplication device as defined in claim 5 wherein said resultant two's complement product is in a minus two's complement form.

7. A multiplication device as defined in claim 5 further comprising a one's complement generating means receiving said product sum and product carry portions and taking the one's complement thereof upon reception of a control signal.

8. A multiplication device as defined in claim 7 wherein said first and second input binary numbers each comprise first and second magnitude portions and first and second sign portions respectively, said first and second storage means receiving said first and second magnitude portions respectively.

9. A multiplication device as defined in claim 8 further comprising a control signal generator receiving said first and second sign portions and forming therefrom said control signal, when said sign portions have opposite binary values.

10. A multiplication device as defined in claim 9 wherein said first and second input numbers further comprise first and second exponent portions.

11. A multiplication device as defined in claim 10 further comprising a third addition means for adding said first and second exponent portions to form a corresponding two's complement exponent of said two's complement product.

12. A multiplication device as defined in claim 1 further comprising accumulation means for storing an accumulation of resultant two's complement products formed by said second addition means.

13. A multiplication device as defined in claim 12 wherein said accumulation of resultant two's complement products is in a minus two's complement representation.

14. A multiplication device as defined in claim 13 further comprising a one's complement generation means receiving said product sum and product carry portions and upon reception of a control signal.

15. A multiplication device as defined in claim 14 wherein said first and second input binary numbers each comprise first and second magnitude portions and first and second sign portions, said partial product generating means receiving said first and second magnitude portions.

16. A multiplication device as defined in claim 15 further comprising a control signal generator receiving said first and second sign portions and forming therefrom said control signal when said sign portions have opposite binary values.

17. A multiplication device as defined in claim 16 wherein said second addition means is in communication with said accumulation means, said second addition means receiving said product sum portion, said product carry portion and the contents of said accumulation means and forming said accumulation of resultant two's complement products, said second addition means conveying said accumulation of resultant two's complement products to said accumulation means for storage therein.

18. A multiplication device as defined in claim 17 further comprising a normalizing means in communication with said second addition means, said normalizing means normalizing said accumulation of resultant two's complement products formed by said second addition means prior to storage in said accumulation means.

19. A multiplication device as defined in claim 18 wherein said normalizing means comprises:
   a leading zeros and ones detection means receiving said accumulation of resultant two's complement products and generating therefrom a detection signal;
   a first shift controller receiving said detection signal and generating a first shifting signal; and
   a first shifting means receiving said first shifting signal and shifting said accumulation of resultant two's complement products in accordance with said first shifting signal, to normalize said accumulation of resultant two's complement products.

20. A multiplication device as defined in claim 19 wherein said first and second input binary numbers and said accumulation of resultant two's complement products further comprise first and second exponent portions and an exponent accumulation portion, respectively.

21. A multiplication device as defined in claim 20 further comprising a third addition means receiving and adding said first and second exponent portions to form a two's complement exponent of said resultant two's complement product.

22. A multiplication device as defined in claim 21 wherein said accumulation means further comprises a second holding means for storing a normalized two's complement accumulation exponent, said normalized two's complement accumulation exponent being the corresponding exponent for said accumulation of resultant two's complement products.

23. A multiplication device as defined in claim 22 further comprising:
   an exponent comparing means receiving and comparing said two's complement accumulation exponent and said two's complement exponent of said resultant two's complement product, and generating therefrom a difference signal; and
   an alignment means receiving said difference signal and shifting to the right by the magnitude of said difference signal either said product sum and product carry portions or the contents of said accumulation means conveyed to the second addition means having the smaller corresponding exponent.

24. A multiplication and accumulation device for forming a two's complement sum of the products of successive pairs of first and second N-bit input binary numbers, comprising:
   a numerical binary offset generating means examining the bit length of said first and second input numbers and generating a numerical binary offset of the value $X=(4-2^{-(N-1)})$ wherein N is a positive integer and corresponds to the bit length of said first and second input numbers;
   a partial product generating means receiving said first and second input binary numbers and generating therefrom first and second sets of partial products;
   a first addition means adding said offset and said first and second sets of partial products to express the result as a product sum portion and a product carry portion;
   an accumulation means for storing an accumulation of resultant two's complement products; and
   a second addition means in communication with said accumulation means, said second addition means adding said product sum and product carry portions and the contents stored in said accumulation means to form said accumulation of resultant two's complement products.

25. A multiplication and accumulation device as defined in claim 24 wherein said partial product generating means comprises:
   an encoding means for encoding said first input number into a plurality of codes and generating for each code an operation signal, said operation signals determining said first set of partial products, said partial product generating means generating a first partial product for each of said operation signals to form said first set of partial products.

26. A multiplication and accumulation device as defined in claim 25 wherein said partial product generating means further comprises sign extension means, said sign extension means examining each of said first partial products and generating for each of said first partial products a second partial product to form said second set of partial products.

27. A multiplication and accumulation device as defined in claim 26 further comprising a one's complement generating means for taking the one's complement of said product sum and product carry terms upon reception of a control signal.

28. A multiplication and accumulation device as defined in claim 27 wherein said input binary numbers comprise magnitude portions and sign portions, said device further comprising first and second storage means receiving said magnitude portions prior to application thereof to said partial product generating means.

29. A multiplication and accumulation device as defined in claim 28 further comprising a control signal generator receiving said first and second sign portions and forming therefrom said control signal, when said sign portions have opposite binary values.

30. A multiplication and accumulation device as defined in claim 29 further comprising a normalizing means in communication with said second addition means, said normalizing means normalizing said accumulation of resultant two's complement products formed by said second addition means prior to storage in said accumulation means.

31. A multiplication and accumulation device as defined in claim 30 wherein said normalizing means comprises:
   a leading zeros and ones detector receiving said accumulation of resultant two's complement products and generating therefrom a detection signal;

a first shift controller receiving said detection signal and generating a first shifting signal; and a first shifting means receiving said first shifting signal and shifting said accumulation of resultant two's complement products in accordance with said first shifting signal, to normalize said accumulation of resultant two's complement products.

32. A multiplication and accumulation device as defined in claim 31 wherein said first and second binary input numbers and said accumulation of resultant two's complement products further comprise first and second exponent portions and an exponent accumulation portion, respectively.

33. A multiplication and accumulation device as defined in claim 32 further comprising a third addition means receiving and adding said first and second exponent portions, to form a two's complement exponent of said resultant two's complement product.

34. A multiplication and accumulation device as defined in claim 33 wherein said accumulation means further comprises a second holding means for storing a normalized two's complement accumulation exponent, said normalized two's complement accumulation exponent being the corresponding exponent for said accumulation of resultant two's complement products.

35. A multiplication and accumulation device as defined in claim 34 further comprising:

an exponent comparing means receiving and comparing said two's complement accumulation exponent and said two's complement exponent of said resultant two's complement product, and generating therefrom a difference signal; and an alignment means receiving said difference signal and shifting to the right by the magnitude of said difference signal either said product sum and product carry portions or the contents of said accumulation means conveyed to the second addition means having the smaller corresponding exponent.

* * * * *